US011099447B2

(12) United States Patent
Woodgate et al.

(10) Patent No.: US 11,099,447 B2
(45) Date of Patent: Aug. 24, 2021

(54) OPTICAL STACK FOR PRIVACY DISPLAY

(71) Applicant: RealD Spark, LLC, Beverly Hills, CA (US)

(72) Inventors: Graham J. Woodgate, Henley-on-Thames (GB); Michael G. Robinson, Boulder, CO (US); Jonathan Harrold, Upper Heyford (GB); Robert A Ramsey, Boulder, CO (US); Ben Ihas, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/945,355

(22) Filed: Jul. 31, 2020

(65) Prior Publication Data

US 2021/0033898 A1 Feb. 4, 2021

Related U.S. Application Data

(60) Provisional application No. 62/882,022, filed on Aug. 2, 2019.

(51) Int. Cl.
| | |
|---|---|
| *G02F 1/137* | (2006.01) |
| *G02F 1/13363* | (2006.01) |
| *G02F 1/1335* | (2006.01) |
| *G02F 1/01* | (2006.01) |
| *G02F 1/1337* | (2006.01) |

(52) U.S. Cl.
CPC ............ *G02F 1/137* (2013.01); *G02F 1/0136* (2013.01); *G02F 1/1337* (2013.01); *G02F 1/13363* (2013.01); *G02F 1/133536* (2013.01); *G02F 2413/01* (2013.01)

(58) Field of Classification Search
None
See application file for complete search history.

(56) References Cited

U.S. PATENT DOCUMENTS 4,621,898 A * 11/1986 Cohen ...................... G02B 5/22
359/601
4,974,941 A 12/1990 Gibbons et al.
5,005,108 A 4/1991 Pristash et al.
(Continued)

FOREIGN PATENT DOCUMENTS

CA 2222313 A1 6/1998
CN 1125943 C 10/2003
(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.
(Continued)

*Primary Examiner* — Ryan Crockett
(74) *Attorney, Agent, or Firm* — Penny L. Lowry

(57) ABSTRACT

A switchable privacy display apparatus comprises a spatial light modulator, a light control film, and a polar control retarder that comprises plural retarders arranged between a display polariser of the spatial light modulator and an additional polariser. The display achieves high image visibility to an off-axis user in a public mode of operation and high image security to an off-axis snooper in privacy mode of operation.

30 Claims, 18 Drawing Sheets

(56) References Cited

U.S. PATENT DOCUMENTS

| | | |
|---|---|---|
| 5,035,491 A | 7/1991 | Kawagishi et al. |
| 5,658,490 A | 8/1997 | Sharp et al. |
| 5,715,028 A | 2/1998 | Abileah et al. |
| 5,808,784 A | 9/1998 | Ando et al. |
| 5,835,166 A | 11/1998 | Hall et al. |
| 5,894,361 A | 4/1999 | Yamazaki et al. |
| 5,914,760 A | 6/1999 | Daiku |
| 6,055,103 A | 4/2000 | Woodgate et al. |
| 6,099,758 A | 8/2000 | Verrall et al. |
| 6,144,433 A | 11/2000 | Tillin et al. |
| 6,204,904 B1 | 3/2001 | Tillin et al. |
| 6,222,672 B1 | 4/2001 | Towler et al. |
| 6,392,727 B1 | 5/2002 | Larson et al. |
| 6,437,915 B2* | 8/2002 | Moseley ............... H04N 13/337 359/465 |
| 7,067,985 B2 | 6/2006 | Adachi |
| 7,163,319 B2 | 1/2007 | Kuo et al. |
| 7,227,602 B2 | 6/2007 | Jeon et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,098,350 B2 | 1/2012 | Sakai et al. |
| 8,154,686 B2 | 4/2012 | Mather et al. |
| 8,237,876 B2* | 8/2012 | Tan ...................... G02B 5/3083 349/5 |
| 8,249,408 B2 | 8/2012 | Coleman |
| 8,262,271 B2 | 9/2012 | Tillin et al. |
| 8,646,931 B2 | 2/2014 | Choi et al. |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1* | 11/2018 | Robinson ............... G02F 1/1337 |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2002/0024529 A1 | 2/2002 | Miller et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0145703 A1 | 7/2004 | O'Connor et al. |
| 2004/0240777 A1 | 12/2004 | Woodgate et al. |
| 2005/0111100 A1 | 5/2005 | Mather et al. |
| 2005/0117186 A1 | 6/2005 | Li et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0219693 A1 | 10/2005 | Hartkop et al. |
| 2006/0066785 A1 | 3/2006 | Moriya |
| 2006/0082702 A1 | 4/2006 | Jacobs et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0068329 A1 | 3/2008 | Shestak et al. |
| 2008/0158491 A1 | 7/2008 | Zhu et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0128746 A1 | 5/2009 | Kean et al. |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0241983 A1 | 10/2011 | Chang |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1* | 5/2012 | Robinson ............... H04N 13/312 359/464 |
| 2012/0147280 A1 | 6/2012 | Osterman et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0039062 A1 | 2/2013 | Vinther et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0111760 A1 | 4/2014 | Guo et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0268358 A1 | 9/2014 | Kusaka et al. |
| 2014/0286043 A1 | 9/2014 | Sykora et al. |
| 2014/0289835 A1 | 9/2014 | Varshaysky et al. |
| 2014/0361990 A1 | 12/2014 | Leister |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |

(56) References Cited

U.S. PATENT DOCUMENTS

| | | | |
|---|---|---|---|
| 2015/0301400 A1 | 10/2015 | Kimura et al. | |
| 2015/0346417 A1 | 12/2015 | Powell | |
| 2015/0346532 A1 | 12/2015 | Do et al. | |
| 2015/0355490 A1 | 12/2015 | Kao et al. | |
| 2015/0378085 A1 | 12/2015 | Robinson et al. | |
| 2016/0103264 A1 | 4/2016 | Lee et al. | |
| 2016/0132721 A1 | 5/2016 | Bostick et al. | |
| 2016/0147074 A1 | 5/2016 | Kobayashi et al. | |
| 2016/0154259 A1 | 6/2016 | Kim et al. | |
| 2016/0216420 A1* | 7/2016 | Gaides | G02B 5/3066 |
| 2016/0216540 A1 | 7/2016 | Cho et al. | |
| 2016/0224106 A1 | 8/2016 | Liu | |
| 2016/0238869 A1 | 8/2016 | Osterman et al. | |
| 2016/0334898 A1 | 11/2016 | Kwak et al. | |
| 2016/0349444 A1 | 12/2016 | Robinson et al. | |
| 2016/0356943 A1 | 12/2016 | Choi et al. | |
| 2016/0357046 A1 | 12/2016 | Choi et al. | |
| 2017/0003436 A1 | 1/2017 | Inoue et al. | |
| 2017/0031206 A1 | 2/2017 | Smith et al. | |
| 2017/0090103 A1 | 3/2017 | Holman | |
| 2017/0092187 A1 | 3/2017 | Bergquist | |
| 2017/0092229 A1 | 3/2017 | Greenebaum et al. | |
| 2017/0115485 A1 | 4/2017 | Saito et al. | |
| 2017/0123241 A1 | 5/2017 | Su et al. | |
| 2017/0139110 A1 | 5/2017 | Woodgate et al. | |
| 2017/0168633 A1 | 6/2017 | Kwak et al. | |
| 2017/0205558 A1 | 7/2017 | Hirayama et al. | |
| 2017/0236494 A1 | 8/2017 | Sommerlade et al. | |
| 2017/0269283 A1 | 9/2017 | Wang et al. | |
| 2017/0269285 A1 | 9/2017 | Hirayama et al. | |
| 2017/0329399 A1 | 11/2017 | Azam et al. | |
| 2017/0336661 A1 | 11/2017 | Harrold et al. | |
| 2017/0339398 A1 | 11/2017 | Woodgate et al. | |
| 2017/0343715 A1 | 11/2017 | Fang et al. | |
| 2018/0014007 A1 | 1/2018 | Brown | |
| 2018/0052346 A1 | 2/2018 | Sakai et al. | |
| 2018/0082068 A1 | 3/2018 | Lancioni et al. | |
| 2018/0095581 A1 | 4/2018 | Hwang et al. | |
| 2018/0113334 A1 | 4/2018 | Fang et al. | |
| 2018/0188576 A1 | 7/2018 | Xu et al. | |
| 2018/0188603 A1 | 7/2018 | Fang et al. | |
| 2018/0196275 A1 | 7/2018 | Robinson et al. | |
| 2018/0210243 A1 | 7/2018 | Fang et al. | |
| 2018/0231811 A1 | 8/2018 | Wu | |
| 2018/0252949 A1 | 9/2018 | Klippstein et al. | |
| 2018/0259799 A1 | 9/2018 | Kroon | |
| 2018/0259812 A1 | 9/2018 | Goda et al. | |
| 2018/0321523 A1 | 11/2018 | Robinson et al. | |
| 2018/0321553 A1 | 11/2018 | Robinson et al. | |
| 2018/0329245 A1 | 11/2018 | Robinson et al. | |
| 2018/0364526 A1 | 12/2018 | Finnemeyer et al. | |
| 2019/0086706 A1 | 3/2019 | Robinson et al. | |
| 2019/0121173 A1 | 4/2019 | Robinson et al. | |
| 2019/0154896 A1 | 5/2019 | Yanai | |
| 2019/0196236 A1 | 6/2019 | Chen et al. | |
| 2019/0197928 A1 | 6/2019 | Schubert et al. | |
| 2019/0215509 A1* | 7/2019 | Woodgate | G02F 1/133753 |
| 2019/0227366 A1 | 7/2019 | Harrold et al. | |
| 2019/0235304 A1 | 8/2019 | Tamada et al. | |
| 2019/0250458 A1 | 8/2019 | Robinson et al. | |
| 2019/0293858 A1 | 9/2019 | Woodgate et al. | |
| 2019/0293983 A1 | 9/2019 | Robinson et al. | |
| 2019/0353944 A1 | 11/2019 | Acreman et al. | |
| 2020/0159055 A1 | 5/2020 | Robinson et al. | |
| 2020/0225402 A1 | 7/2020 | Ihas et al. | |

FOREIGN PATENT DOCUMENTS

| | | |
|---|---|---|
| CN | 1776484 A | 5/2006 |
| CN | 101681061 A | 3/2010 |
| CN | 104133292 A | 11/2014 |
| CN | 204740413 U | 11/2015 |
| CN | 209171779 U | 7/2019 |
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | H11174489 A | 7/1999 |
| JP | 2007148279 A | 6/2007 |
| JP | 2007273288 A | 10/2007 |
| KR | 20120041228 A | 2/2012 |
| KR | 101990286 B1 | 6/2019 |
| TW | M537663 U | 3/2017 |
| WO | 2005071449 A2 | 8/2005 |
| WO | 2010021926 A2 | 2/2010 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.

(56) References Cited

OTHER PUBLICATIONS

PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
Weindorf et al., Active Circular Polarizer OLED E-Mirror, Proceedings of the Society for Information Display 25th Annual Symposium of Vehicle Displays, Livonia, MI, pp. 225-237, Sep. 25-26, 2018.
PCT/US2020/044574 International search report and written opinion of the international searching authority dated Oct. 21, 2020.
PCT/US2020/040686 International search report and written opinion of the international searching authority dated Nov. 20, 2020.
PCT/US2020/060155 International search report and written opinion of the international searching authority dated Feb. 5, 2021.
PCT/US2020/060191 International search report and written opinion of the international searching authority dated Feb. 8, 2021.
Robson, et al. "Spatial and temporal contrast-sensitivity functions of the visual system", J. Opt. Soc. Amer., vol. 56, pp. 1141-1142 (1966).
PCT/US2020/053863 International search report and written opinion of the international searching authority dated Mar. 12, 2021.
PCT/US2020/063638 International search report and written opinion of the international searching authority dated Mar. 2, 2021.
PCT/US2020/064633 International search report and written opinion of the international searching authority dated Mar. 15, 2021.
Simonyan et al., "Very Deep Convolutional Networks For Large-Scale Image Recognition", ICLR 2015.
CN201880042320.X Notification of the First Office Action dated May 25, 2021.
EP-18855604.7 Extended European Search Report of European Patent Office dated Jun. 1, 2021.
EP-18857077.4 Extended European Search Report of European Patent Office dated Jun. 16, 2021.

\* cited by examiner

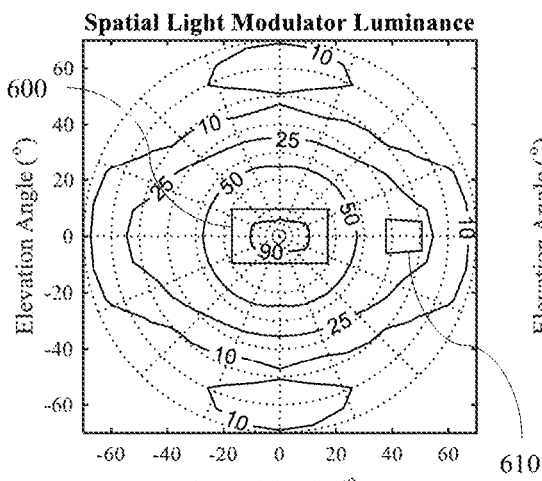 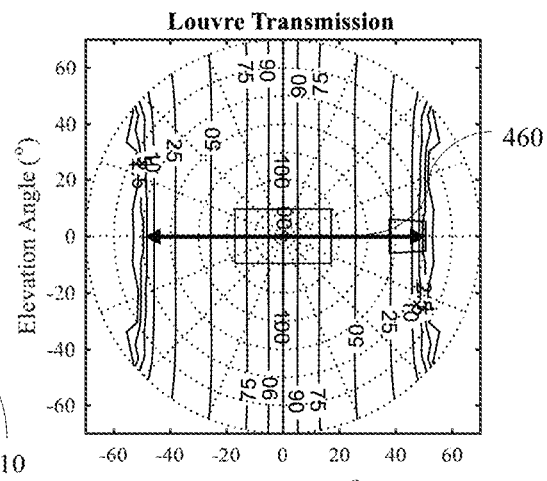
FIG. 10A  FIG. 10B
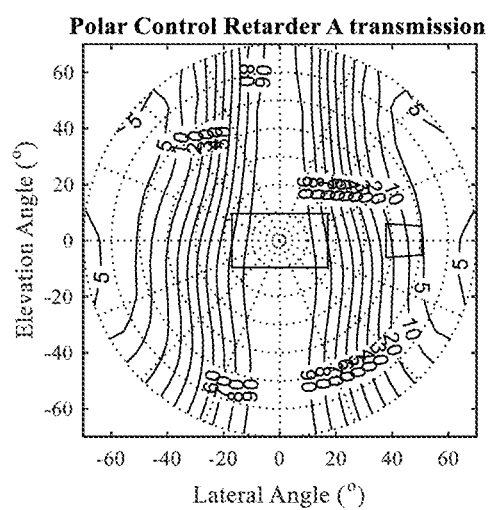 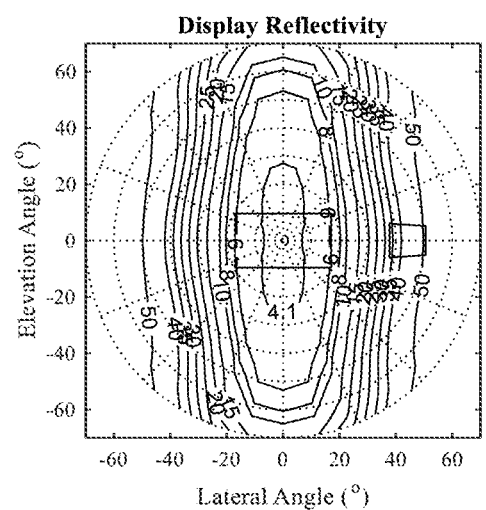
FIG. 10C  FIG. 10D
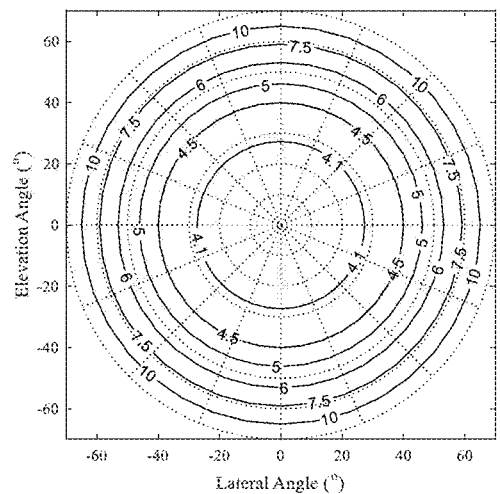
FIG. 11

Reflectivity

OPTICAL STACK FOR PRIVACY DISPLAY

TECHNICAL FIELD

This disclosure generally relates to optical stacks for use in privacy display and low stray light displays.

BACKGROUND

Privacy displays provide image visibility to a primary user that is typically in an on-axis position and reduced visibility of image content to a snooper, that is typically in an off-axis position.

Switchable privacy displays may be provided by control of the off-axis optical output.

Control of off-axis privacy may be provided by means of contrast reduction, for example by adjusting the liquid crystal bias tilt in an In-Plane-Switching LCD.

Control may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders and compensation retarders arranged to modulate the input and/or output directional luminance profile of a spatial light modulator.

Control may be further provided by means of off-axis reflectivity increase. Reflectivity increase may be achieved by means of switchable liquid crystal retarders, compensation retarders that are arranged to control the polarisation of ambient light that falls onto a reflective polariser.

BRIEF SUMMARY

According to a first aspect of the present disclosure there is provided a display device comprising: a spatial light modulator arranged to output spatially modulated light, the spatial light modulator including a display polariser arranged on a side of the spatial light modulator, the display polariser being a linear polariser; an additional polariser arranged on the same side of the spatial light modulator as the display polariser, the additional polariser being a linear polariser; at least one polar control retarder arranged between the additional polariser and the display polariser, and a light control film arranged in series with the spatial light modulator, the additional polariser and the at least one polar control retarder, wherein the light control film comprises an input surface, an output surface facing the input surface, an array of transmissive regions extending between the input surface and the output surface, and absorptive regions between the transmissive regions and extend at least partway between the input surface and the output surface. Advantageously a switchable privacy display may be provided with regions of increased security factor and with increased size of polar regions over which desirable security factor is achieved. In a public mode of operation, off-axis users may be provided with increased image visibility.

The light control film may have a transmittance that is 5% or more in a range of polar angles in a direction in which the array of transmissive regions repeats that may be at least 80° wide, be at least 90° wide and may be at most 130° wide. The absorptive regions of the light control film may have a thickness, t, wherein t may be given by the expression:

$$t=(S_{IN}-S_{IN}^2/10p+S_{OUT})/(2*\tan(a\sin(\xi/n)))$$

where $S_{IN}$ is a width of an aperture of the input end of the absorptive regions, $S_{OUT}$ is a width of an aperture of the output end of the absorptive regions, p is a pitch of the transmissive regions in the direction in which the array of transmissive regions repeats, and n is the refractive index of the transmissive regions; wherein $\xi$ may be 0.643 or more, $\xi$ may be 0.707 or more and $\xi$ may be 0.906 or less. Advantageously increased image visibility may be achieved in a public mode of operation for off-axis users.

The light control film may have a transmittance that may have profiles with polar angle in a direction in which the array of transmissive regions repeats that have centre lines directed inwardly towards an optical axis extending forwardly from the centre of the spatial light modulator. Said centre lines of said profiles may be directed towards a common point. The light control film may have a transmittance that may have a profile with polar angle in a direction in which the array of transmissive regions repeats that is centred on the normal to the plane of the spatial light modulator at all positions across the light control film. The transmissive regions may be tilted so that axes defined in respect of each transmissive region between centres of apertures of input and output ends of the transmissive regions may be directed inwardly towards an optical axis extending forwardly from the centre of the spatial light modulator. Said axes may be directed towards a common point. Advantageously image uniformity of luminance may be increased for a primary display user. Uniformity of image security may be increased for off-axis snoopers.

The transmissive regions have axes defined in respect of each transmissive region between centres of apertures of input and output ends of the transmissive regions may be normal to the plane of the spatial light modulator at all positions across the light control film. Advantageously the light control film may be conveniently tooled at low cost.

The array of transmissive regions may be a one-dimensional array of elongate transmissive regions. Advantageously increased transmission is achieved for desirable image security levels.

The absorptive regions between the transmissive regions extend between the input surface and the output surface. The light control film may be provided on a support substrate. High uniformity of alignment of the light transmission regions may be obtained and display uniformity may be increased.

Said display polariser may be an output display polariser arranged on the output side of the spatial light modulator. The display device further comprises a reflective polariser arranged between the output display polariser and at least one first polar control retarder, the reflective polariser being a linear polariser. A privacy mode may be provided with increased reflectivity for off-axis snooper locations. Advantageously image security factor may be increased in environments with ambient illuminance.

The light control film may be arranged between the reflective polariser and the spatial light modulator. Advantageously the reflectivity of the display is not reduced in privacy mode, and the luminance for off-axis snoopers is reduced, increasing security factor in privacy mode.

The spatial light modulator comprises an emissive spatial light modulator arranged to emit the spatially modulated light. Advantageously thickness and cost may be reduced.

The display device further comprises a backlight arranged to output light, the spatial light modulator comprises a transmissive spatial light modulator arranged to receive and spatially modulate the output light from the backlight, and the light control film may be arranged between the backlight and the spatial light modulator. In comparison to emissive displays, off-axis luminance may be reduced and advantageously security factor increased. Backlights that use recirculated light may be used so that advantageously yield, uniformity and resilience to damage of the backlight may be increased.

The display device further comprises a backlight arranged to output light, the spatial light modulator comprises a transmissive spatial light modulator arranged to receive and spatially modulate the output light from the backlight, and the light control film may be arranged in front of the spatial light modulator. Reduced scatter for off-axis light may be achieved and advantageously high angle luminance may be reduced so that security factor is increased.

The display device further comprises a backlight arranged to output light, the spatial light modulator comprises a transmissive spatial light modulator arranged to receive and spatially modulate the output light from the backlight, and said display polariser may be an input display polariser arranged on the input side of the spatial light modulator. Frontal reflections to the primary head-on user may be reduced, advantageously increasing image contrast for head-on users in bright ambiently illuminated environments.

The light control film may be arranged between the backlight and the additional polariser. Scatter and depolarisation in the polar control retarder may be increased, advantageously achieving reduced off-axis luminance and increased security factor.

The at least one polar control retarder includes a switchable liquid crystal retarder. The switchable liquid crystal retarder comprises a layer of liquid crystal material and at least one surface alignment layer disposed adjacent to the layer of liquid crystal material. The switchable liquid crystal retarder comprises two surface alignment layers disposed adjacent to the layer of liquid crystal material and on opposite sides thereof and arranged on respective liquid crystal encapsulation substrates. Advantageously a switchable privacy display may be provided with high image security for off-axis snoopers in privacy mode and image visibility for off-axis users in public mode.

The light control film may be provided on one of the liquid crystal encapsulation substrates. Advantageously the thickness of the optical stack may be reduced and the flatness of the light control film may be increased to achieve increased uniformity.

The at least one polar control retarder further includes at least one passive compensation retarder. Advantageously the size of the polar region over which desirable image security is achieved in privacy mode may be increased.

The support substrate comprises at least one passive compensation retarder of the at least one passive compensation retarders. Advantageously the thickness of the optical stack may be reduced and the flatness of the light control film may be increased to achieve increased uniformity.

Embodiments of the present disclosure may be used in a variety of optical systems. The embodiment may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 10A is a schematic graph illustrating the variation with direction of luminance for a backlight comprising crossed brightness enhancement films;

FIG. 10B is a schematic graph illustrating the variation with direction of luminance for a backlight comprising a light control film that has a transmittance that is 5% or more in a range of polar angles in a direction in which the array of transmissive regions transmit that is greater than 96° wide for all azimuthal angles;

FIG. 10C is a schematic graph illustrating the variation with direction of transmission of a polar control retarder of FIG. 1;

FIG. 10D is a schematic graph illustrating the variation with direction of reflection of a polar control retarder and reflective polariser of FIG. 1;

FIG. 11 is a schematic graph illustrating the variation with direction of Fresnel reflection of a single surface in air;

DETAILED DESCRIPTION

Figure 1:
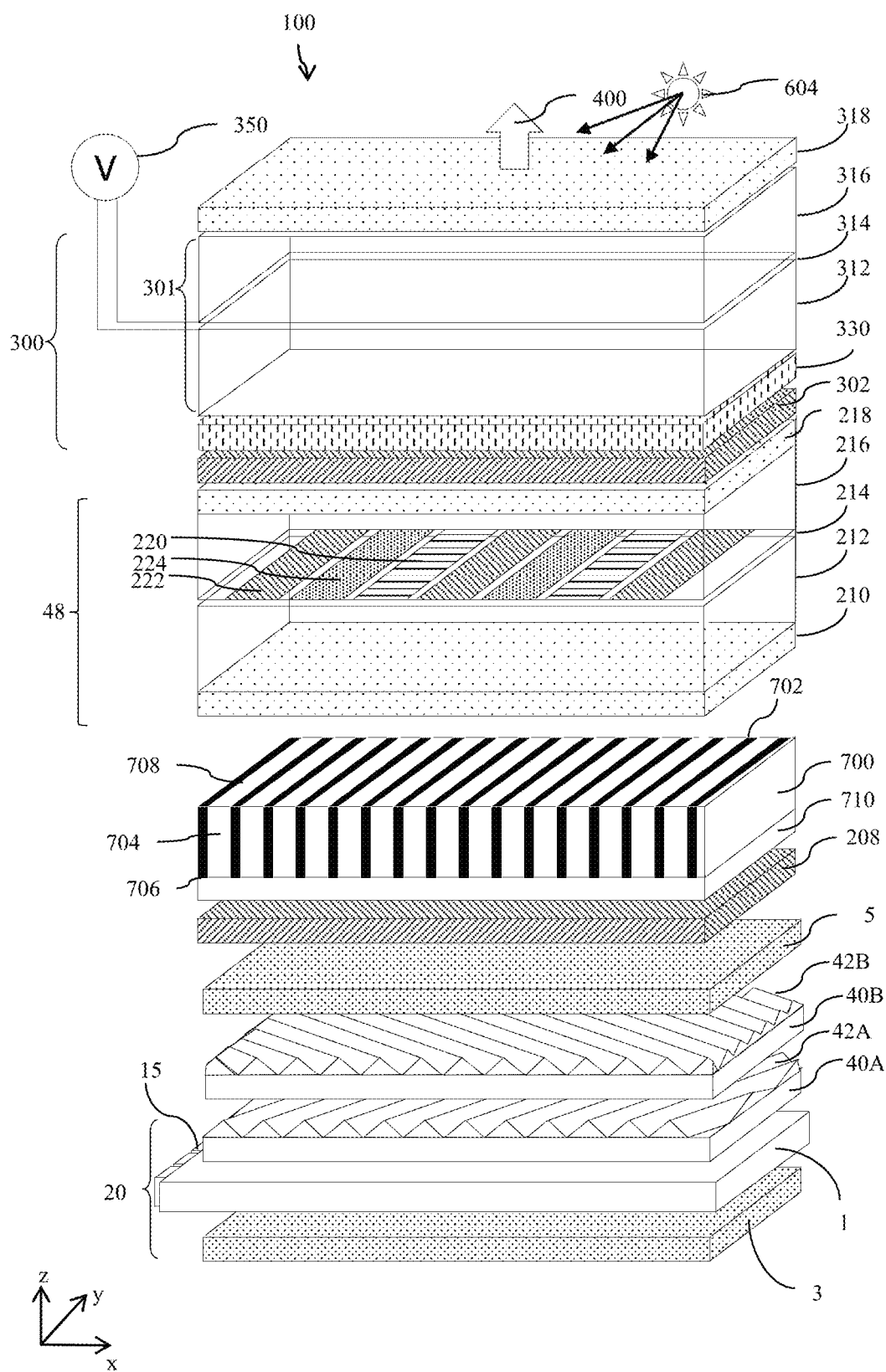
FIG. 1 is a schematic diagram illustrating in perspective side view a switchable privacy display apparatus comprising a backlight comprising crossed brightness enhancement films, a light control film, a transmissive spatial light modulator with input and output display polarisers, a reflective polariser, a polar control retarder and an additional polariser.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{equ. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to a positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

Terms related to privacy display appearance will now be described.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y+R)/(Y+K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y+K \sim P \cdot L \qquad \text{eqn. 6}$$

The visual security level may then be further given as:

$$VSL = \frac{(C + I \cdot \rho / \pi \cdot (C+1) / (P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is $\rho$.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL = 1 + I \cdot \rho / (\pi \cdot P \cdot L) \qquad \text{eqn. 8}$$

The perceptual image security may be determined from the logarithmic response of the eye, such that the security factor, S is given by:

$$S = \log_{10}(V) \qquad \text{eqn. 9}$$

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation $I(\theta)$ of illuminance of a substantially Lambertian emitting lightbox with polar viewing angle was determined by measuring the variation of recorded reflective luminance with polar viewing angle taking into account the variation of reflectivity $\rho(\theta)$. The measurements of $P(\theta)$, $r(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 m, and adjusted their polar angle of viewing at zero elevation until image invisibility was achieved for one eye from a position near on the display at or close to the centre-line of the display. The polar location of the observer's eye was recorded. From the relationship S(θ), the security factor at said polar location was determined. The measurement was repeated for the different images, for various display luminance $Y_{max}$, different lightbox illuminance I(q=0), for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In comparison to privacy displays, desirably wide-angle displays are easily observed in standard ambient illuminance conditions. One measure of image visibility is given by the contrast sensitivity such as the Michelson contrast which is given by:

$$M=(I_{max}+I_{min})/(I_{max}+I_{min}) \qquad \text{eqn. 10}$$

and so:

$$M=((Y+R)-(K+R))/((Y+R)+(K+R))=(Y-K)/(Y+K+2 \cdot R) \qquad \text{eqn. 11}$$

Thus the visual security level (VSL), is equivalent (but not identical to) 1/M. In the present discussion, for a given off-axis relative luminance, P the wide-angle image visibility, W is approximated as $$W=1/VSL=1/(1+I \cdot \rho/(\pi \cdot P \cdot L)) \qquad \text{eqn. 12}$$

In the present discussion the colour variation Δε of an output colour ($u_w'+\Delta u'$, $v_w'+\Delta v'$) from a desirable white point ($u_w'$, $v_w'$) may be determined by the CIELUV colour difference metric, assuming a typical display spectral illuminant and is given by:

$$\Delta \varepsilon=(\Delta u'^2+\Delta v'^2)^{1/2} \qquad \text{eqn. 13}$$

Catadioptric elements employ both refraction and reflection, which may be total internal reflection or reflection from metallised surfaces.

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

It may be desirable to provide high visual security levels for spatial light modulators and/or backlights that provide high luminance in off-axis viewing angles. The structure of a switchable privacy display will now be described.

Figure 2:
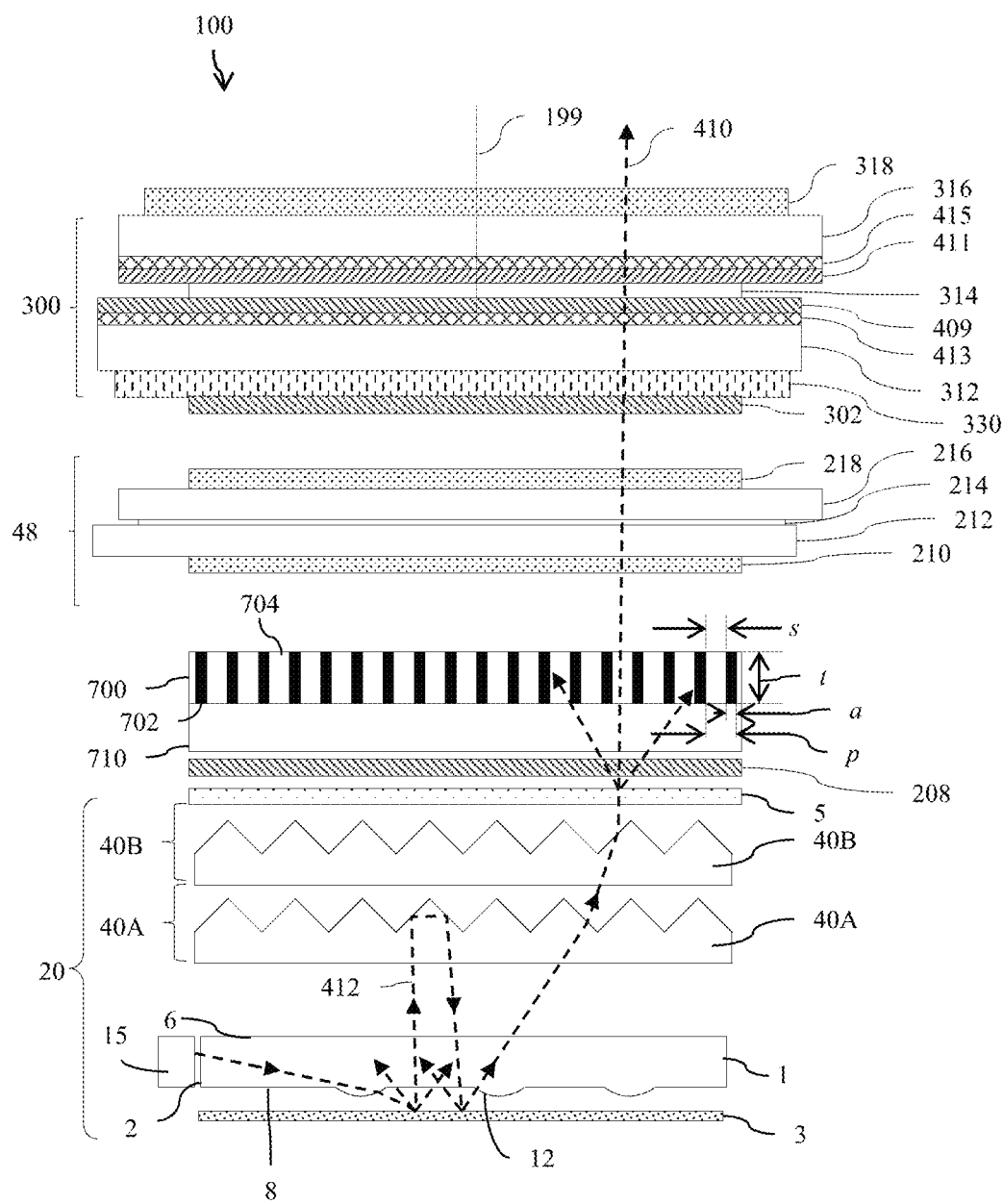
FIG. 2 is a schematic diagram illustrating in side view the privacy display of FIG. 1.

FIG. 1 is a schematic diagram illustrating in perspective side view a switchable privacy display apparatus 100 comprising a backlight 20 comprising crossed brightness enhancement films 40A, 40B, a light control film 700, a transmissive spatial light modulator 48 with input and output display polarisers 210, 218, a reflective polariser 302, a polar control retarder 300 and an additional polariser 318; and FIG. 2 is a schematic diagram illustrating in side view the privacy display 100 of FIG. 1.

Display device 100 comprises a spatial light modulator 48 arranged to output spatially modulated light. The display device 100 further comprises a backlight 20 arranged to output light and the spatial light modulator 48 comprises a transmissive spatial light modulator 48 arranged to receive and spatially modulate the output light from the backlight 20. Spatially modulated light is provided by controllable pixels modulating the light from backlight 20. The transmissive spatial light modulator 48 may comprise a liquid crystal display comprising encapsulation substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

In the present embodiment the spatial light modulator 48 includes a display polariser 218 arranged on the output side of the spatial light modulator, the display polariser 218 being a linear polariser. An additional polariser 318 is arranged on the same side of the spatial light modulator as the display polariser, the additional polariser 318 being a linear polariser.

Backlight 20 will now be further described. The backlight apparatus 20 comprises a rear reflector 3; and an illumination apparatus comprising waveguide 1 and light sources 15. Light rays 412 from the source 15 are input through input side 2 and guide within the surfaces 6, 8 of the waveguide 1. Light is output by means of extraction features 12 and is incident onto rear reflector 3 which may reflect light either by scattering or specular reflection back through the waveguide 1 and towards crossed brightness enhancement films 40A, 40B that are arranged to receive light exiting from the first surface 6 of waveguide 1. In the present embodiments, 'crossed' refers to an angle of substantially 90° between the optical axes of the two retarders in the plane of the retarders.

Brightness enhancement films 40A, 40B each comprise a prismatic layer with prismatic surfaces 42A, 42B arranged between the optical waveguide 1 and the spatial light modulator 48 to receive output light from the optical waveguide 1. Light rays 412 from the waveguide direct the output light through the spatial light modulator 48.

The prismatic surfaces 42A, 42B are elongate; and the orientation of the elongate prismatic surfaces of the turning film and further turning film are crossed. Light that is in directions near to the optical axis 199 are reflected back towards the reflector 3, whereas light rays 410 that are closer to grazing the surface 6 is output in the normal direction.

Optical stack 5 may comprise diffusers, light turning films and other known optical backlight structures. Asymmetric diffusers, that may comprise asymmetric surface relief features for example, may be provided in the optical stack 5 with increased diffusion in the elevation direction in comparison to the lateral direction. Advantageously image uniformity may be increased.

Optionally reflective polariser 208 may be provided between the input display polariser 210 and backlight 20 to provide recirculated light and increase display efficiency. Advantageously efficiency may be increased.

The light recirculating components 3, 40A, 40B, 208 of backlight 20 achieve a mixing of output light from the waveguide. Such recirculation is tolerant to manufacturing defects and backlights 20 may advantageously be provided with larger size, lower cost and higher luminance uniformity than the collimated backlights that will be illustrated with reference to FIG. 3A, below. However, such backlights provide increased luminance at higher polar angles that may degrade security factor in privacy mode of operation as will be described below.

It would be desirable to provide high uniformity backlights with low manufacturing cost while achieving high security factor in privacy mode, and achieving desirable luminance in the public mode of operation.

A light control film 700 is arranged between the backlight 20 and the spatial light modulator 48. The light control film 700 comprises an input surface 706, an output surface 708 facing the input surface 706, an array of light transmissive regions 704 extending between the input surface 706 and the output surface 708, and absorptive regions 702 between the transmissive regions and extending between the input surface and the output surface.

Light control film 700 is arranged between the reflective polariser 208 of the backlight 20 and the display input polariser 210. Light control film 700 may further comprise a support substrate 710. Advantageously the flatness of the light control film may be increased to achieve increased uniformity. The structure and operation of the light control film will be further described hereinbelow.

It would be desirable to provide a switchable privacy display. Light control film 700 is arranged in series with the spatial light modulator 48, the additional polariser 318 and a polar control retarder 300.

Polar control retarder 300 comprises: (i) a switchable liquid crystal retarder 301 comprising a layer 314 of liquid crystal material arranged between transparent encapsulation substrates 312, 316 and arranged between the display polariser 218 and the additional polariser 318; and (ii) at least one passive compensation retarder 330.

Polar control retarder 300 is arranged between the additional polariser 318 and the display polariser 218. The general principles of operation of polar control retarders 300 arranged between polariser 218, 302, 318 will be described hereinbelow with respect to FIG. 22A to FIG. 23D.

The polar control retarder 300 includes a switchable liquid crystal retarder 301. The switchable liquid crystal retarder 301 comprises a layer 314 of liquid crystal material surface alignment layers 409, 411 disposed adjacent to the layer 314 of liquid crystal material. The switchable liquid crystal retarder 301 comprises two surface alignment layers 409, 411 disposed adjacent to the layer of liquid crystal material 314 and on opposite sides thereof and arranged on respective liquid crystal encapsulation substrates 312, 316. Further electrodes 413, 415 are arranged to provide a drive voltage across the liquid crystal layer 314. In a privacy mode of operation, a first ac voltage is applied by driver 350 and in a public mode of operation a second ac voltage that may be zero or a different voltage to the privacy mode is applied by driver 350 across electrodes 413, 415.

The display device 100 further comprises a reflective polariser 302 arranged between the output display polariser 218 and at least one first polar control retarder 300, the reflective polariser 302 being a linear polariser. Reflective polariser 302 is different in function and operation to the reflective polariser 208 described above. Reflective polariser 302 achieves increased frontal reflection and increased security factor while reflective polariser 208 achieves increased recirculation efficiency and uniformity in a backlight.

In alternative embodiments (not shown), a further polar control retarder may be arranged between the input polariser 210 and a further additional polariser arranged between the backlight and the input polariser 210. In further alternative embodiments (not shown), a further additional polariser may be arranged between the reflective polariser 302 and output polariser 218. A further polar control retarder may be arranged between the output polariser 218 and the further additional polariser. Further additional polarisers and further additional polar control retarders may advantageously achieve increased luminance to off-axis users in a public mode of operation, and may achieve narrower switch-on angles for desirable image security factor in privacy mode of operation.

An alternative display structure will now be illustrated.

Figure 3A:
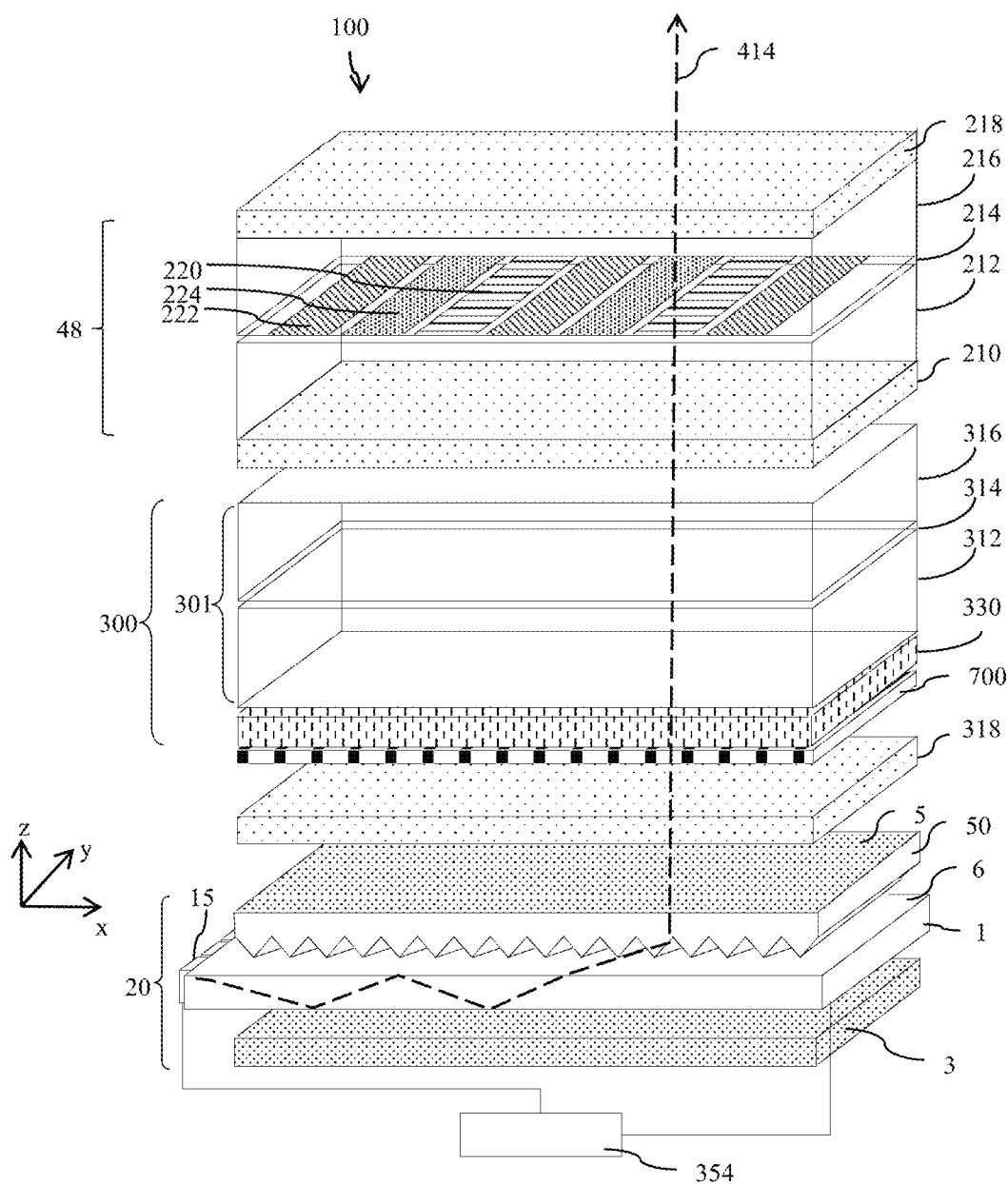
FIG. 3A is a schematic diagram illustrating in perspective side view a switchable privacy display apparatus comprising a backlight comprising a light turning film, an additional polariser, a light control film arranged on a passive retarder of a polar control retarder, a liquid crystal retarder of a polar retarder and a transmissive spatial light modulator with input and output polarisers.

FIG. 3A is a schematic diagram illustrating in perspective side view a switchable privacy display apparatus comprising a backlight 20 comprising a light turning film 50, an additional polariser 318, a light control film 700 arranged on a passive C-plate retarder 330 of a polar control retarder 300, a liquid crystal retarder 301 of the polar retarder 300 and a transmissive spatial light modulator 48 with input and output polarisers 210, 218. The display device 100 comprises a backlight 20 arranged to output light, the spatial light modulator 48 comprises a transmissive spatial light modulator 48 arranged to receive and spatially modulate the output light from the backlight 20, and said display polariser is an input display polariser 210 arranged on the input side of the spatial light modulator 48.

FIG. 3A illustrates an alternative to FIG. 1 wherein the polar control retarder 300 is arranged between the additional polariser 318 and the input polariser 210 of the spatial light modulator 48. Reflective polariser 302 is omitted. The frontal reflection from the display 100 is reduced, advantageously achieving increased contrast for the display in high illuminance. Further the front-of display thickness is reduced, achieving increased image resolution in embodiments providing scattering output surfaces of polariser 218.

Light control film 700 is arranged between the additional polariser 318 and display polariser 210. FIG. 3A illustrates another alternative to FIG. 1 wherein the support substrate 710 of the light control film 700 is omitted and the light control film 700 is provided on the passive retarder 330. Advantageously thickness and cost may be reduced, and uniformity may be maintained.

In alternative embodiments (not shown) light control film 700 may be attached to 312, 316. Advantageously thickness may be reduced, and the flatness of the light control film 700 may be achieved, increasing uniformity of output.

FIG. 3A further shows one alternative backlight 20 in comparison to the backlight 20 of FIG. 1 and FIG. 2. In comparison to FIG. 1, the rear reflector 3 is a specular reflector and the waveguide has surface structure arranged to provide output light near to grazing output angles at the output surface 6 of the waveguide 1. As will be described in FIG. 15, advantageously such a backlight can achieve a narrower optical output solid angle than the optical output of the backlight 20 of FIG. 1. Advantageously a privacy display with increased security factor and with a narrower switch-on angle for privacy may be provided.

Features of the embodiment of FIG. 3A not discussed in further detail may be assumed to correspond to the features with equivalent reference numerals as discussed above, including any potential variations in the features.

Figure 3B:
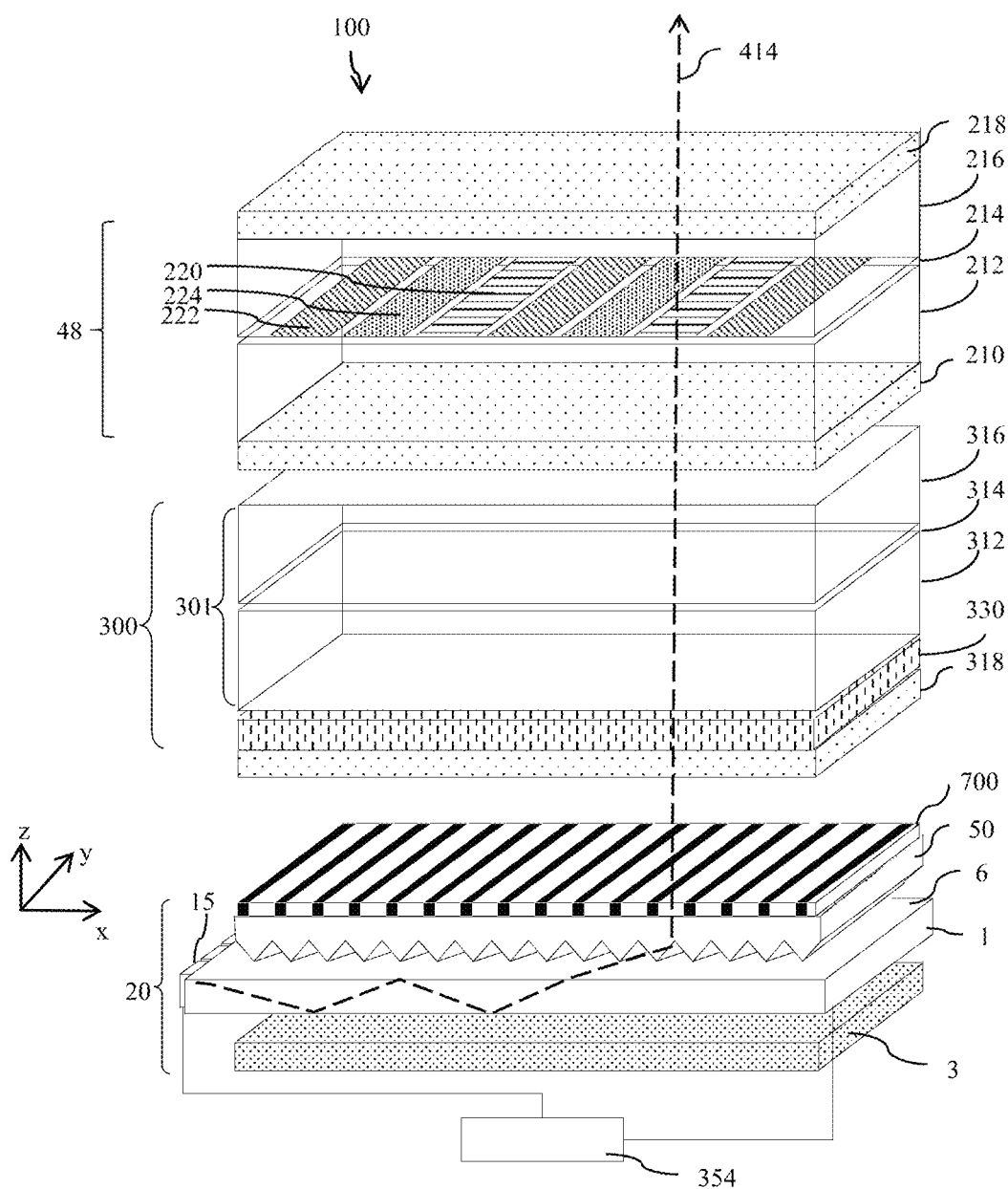
FIG. 3B is a schematic diagram illustrating in perspective side view a switchable privacy display apparatus comprising a backlight comprising a light control film arranged on a light turning film, an additional polariser, a polar control retarder, and a transmissive spatial light modulator with input and output polarisers.

FIG. 3B is a schematic diagram illustrating in perspective side view a switchable privacy display apparatus 100 comprising a backlight 20 comprising a light control film 700 arranged on light turning film 50, an additional polariser 318, a polar control retarder 300, and a transmissive spatial light modulator 48 with input and output polarisers 210, 218.

The light control film 700 is arranged between the backlight 20 and the additional polariser 318. Residual retardance, scatter and stray light in the light control film does not reduce the contrast of the polar control retarder for off-axis viewing locations. Advantageously the security factor for off-axis snoopers may be increased in comparison to the arrangement of FIG. 3A.

FIG. 3B illustrates another alternative substrate for the light control film provided by light turning film 50. Advantageously thickness and cost may be reduced and uniformity may be increased.

Features of the embodiment of FIG. 3B not discussed in further detail may be assumed to correspond to the features with equivalent reference numerals as discussed above, including any potential variations in the features.

Figure 4:
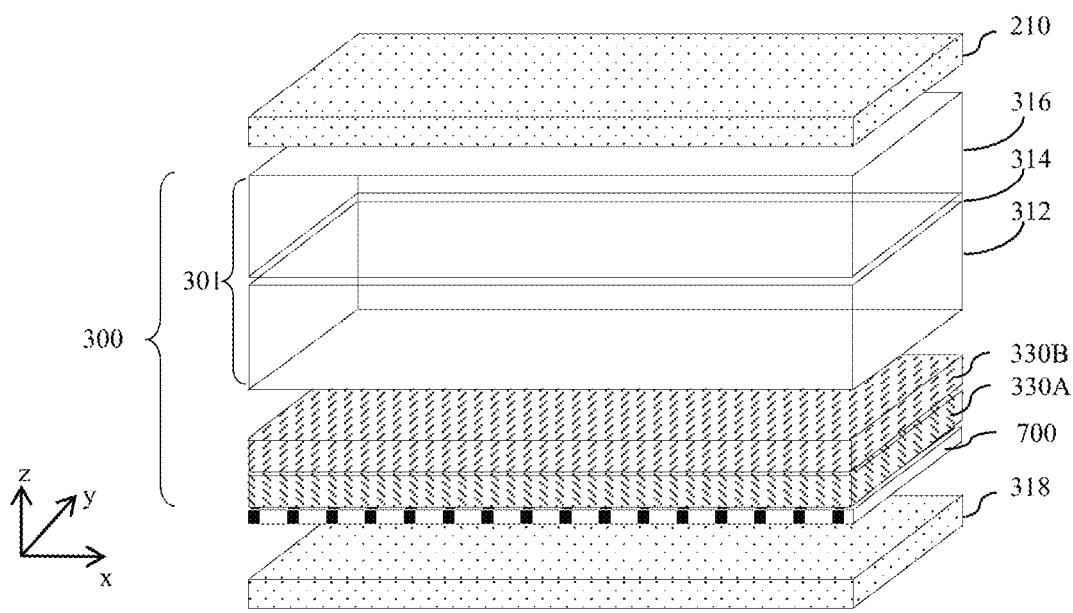
FIG. 4 is a schematic diagram illustrating in perspective side view a polar control retarder and light control film for a switchable privacy display apparatus wherein the support substrate of the light control film is provided by a one of a pair of crossed A-plates.

FIG. 4 is a schematic diagram illustrating in perspective side view a polar control retarder 300 and light control film 700 for a switchable privacy display apparatus wherein the support substrate of the light control film 700 is provided by a one of a pair of crossed A-plates 330A, 330B. In comparison to the C-plate retarder of FIG. 1, FIG. 2 and FIG. 3A, A-plates may provide increased region of high security factor in liquid crystal modes with homogeneous alignment of alignment layers 409, 411.

The light control film 700 may be provided on the passive retarder 330A. Advantageously thickness and cost may be reduced, and uniformity may be maintained. The polar control retarder 300 of FIG. 4 may be provided between the additional polariser 318 and the input polariser 210 or between the additional polariser 318 and an output polariser 218 of the spatial light modulator 48.

Features of the embodiment of FIG. 4 not discussed in further detail may be assumed to correspond to the features with equivalent reference numerals as discussed above, including any potential variations in the features.

It may be desirable to provide a switchable privacy display using an emissive spatial light modulator 48.

Figure 5:
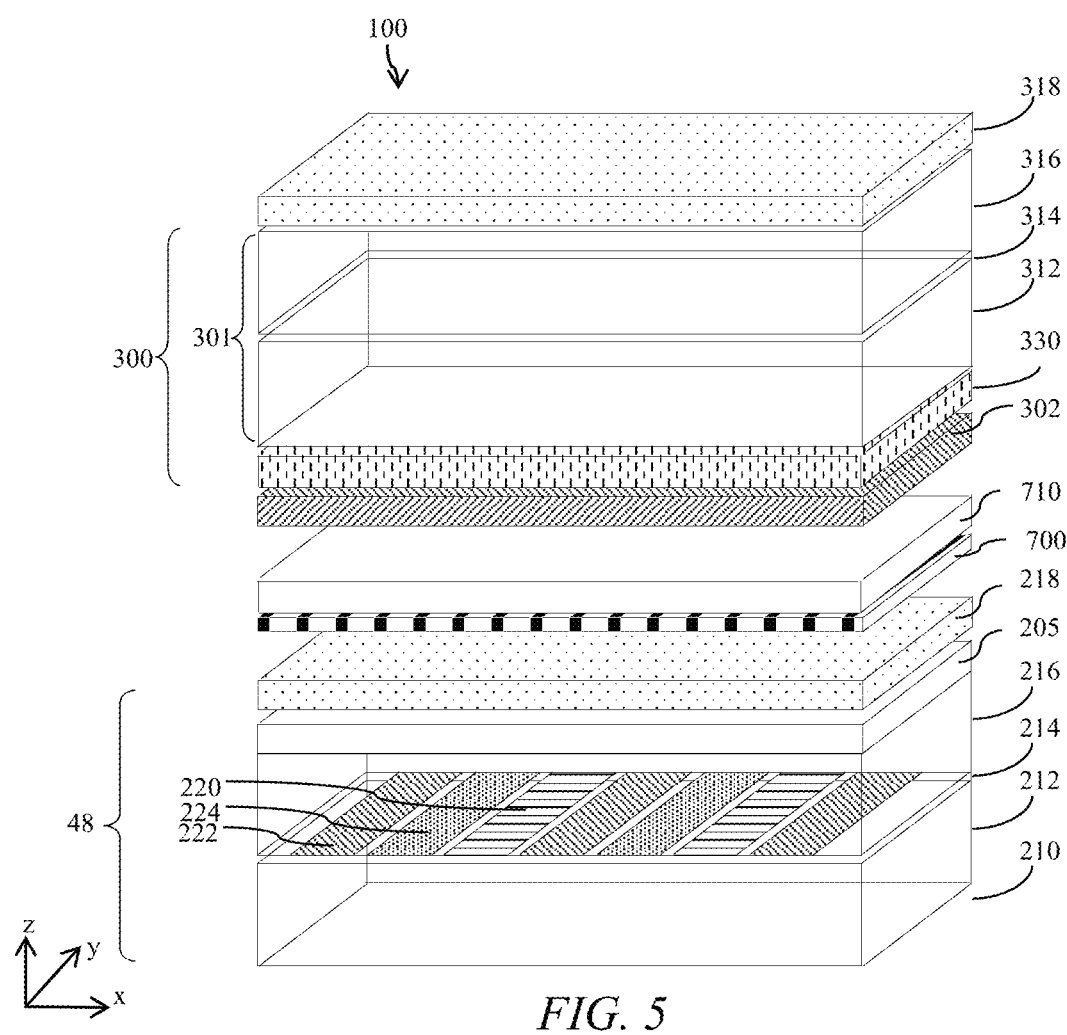
FIG. 5 is a schematic diagram illustrating in perspective side view a switchable privacy display apparatus comprising an emissive spatial light modulator with an output display polariser, a light control film, a reflective polariser, a polar control retarder and an additional polariser.

FIG. 5 is a schematic diagram illustrating in perspective side view a switchable privacy display apparatus 100 comprising an emissive spatial light modulator 48 with an output display polariser 218, a light control film 700, a reflective polariser 302, a polar control retarder 300 and an additional polariser 318.

Emissive spatial light modulator further comprises quarter waveplate 205 and display polariser 218 that are arranged to reduce visibility of reflections from the pixel plane 214 of the spatial light modulator 48.

The spatial light modulator 48 comprises an emissive spatial light modulator arranged to emit the spatially modulated light. Spatial light modulator 48 may be an OLED display or a micro-LED display with an array of self-emitting pixels 220, 222, 224 in comparison to the transmissive pixels of FIG. 1.

Light control film 700 is arranged between the reflective polariser 302 and the spatial light modulator 48. Light control film 700 is arranged between the reflective polariser 302 and the display polariser 218.

In alternative embodiments the emissive spatial light modulator 48 of FIG. 5 may be provided by a transmissive spatial light modulator 48 and backlight 20 as described elsewhere herein. The backlight 20 may provide lower luminance at high polar angles in comparison to the emission directions of emissive spatial light modulator 48. Advantageously luminance at high angles may be reduced to achieve increased security factor for off-axis snoopers in privacy mode of operation.

Features of the embodiment of FIG. 5 not discussed in further detail may be assumed to correspond to the features with equivalent reference numerals as discussed above, including any potential variations in the features.

Figure 6:
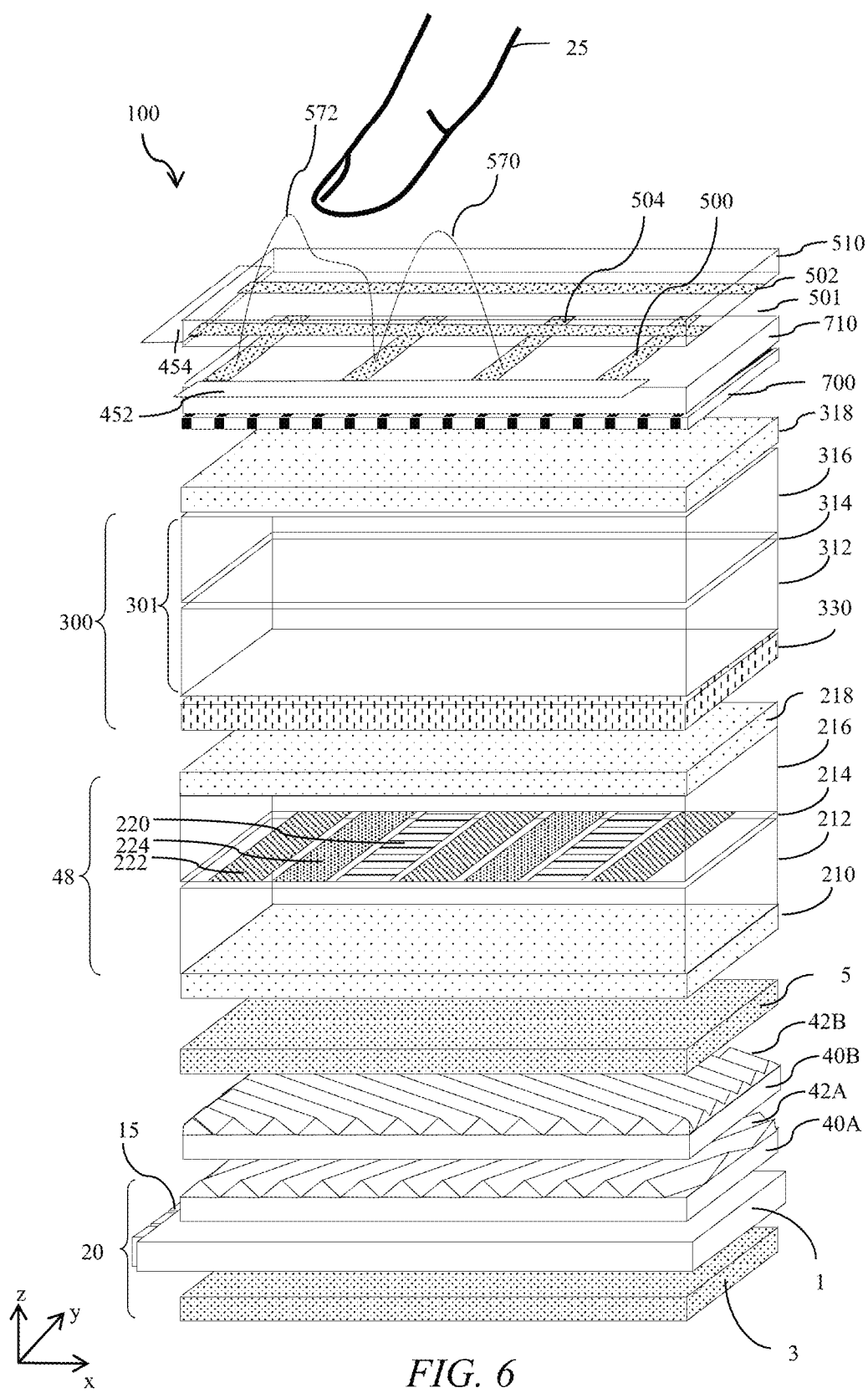
FIG. 6 is a schematic diagram illustrating in perspective side view a switchable privacy display apparatus comprising a spatial light modulator with an output display polariser, a light control film, a polar control retarder, an additional polariser, a light control film wherein the support substrate of the light control film is provided with sensing electrodes of a touch screen.

FIG. 6 is a schematic diagram illustrating in perspective side view a switchable privacy display apparatus 100 comprising a spatial light modulator 48 with an output display polariser 218, a polar control retarder 300, an additional polariser 318, a light control film 700 wherein the support substrate of the light control film is provided with electrodes of a touch screen.

The display device 100 further comprises a backlight 20 arranged to output light, the spatial light modulator comprises a transmissive spatial light modulator 48 arranged to receive and spatially modulate the output light from the backlight 20, and the light control film is arranged in front of the spatial light modulator 48.

Electrodes 500 and drivers 452 are arranged on the support substrate 710 and further electrodes 502 and drivers 454 are provided on substrate 510, with dielectric 501 provided between substrates 710, 510. A finger 25 in close proximity may modulate projected field lines 570, 572 that may be detected to provide a touch input. The light control film 700 is separated from the pixel plane 214 and Moiré may advantageously be reduced. The number of substrates may be reduced, advantageously reducing thickness and cost.

Features of the embodiment of FIG. 6 not discussed in further detail may be assumed to correspond to the features with equivalent reference numerals as discussed above, including any potential variations in the features.

The structure and operation of the light control film 700 will now be described.

Figure 7A:
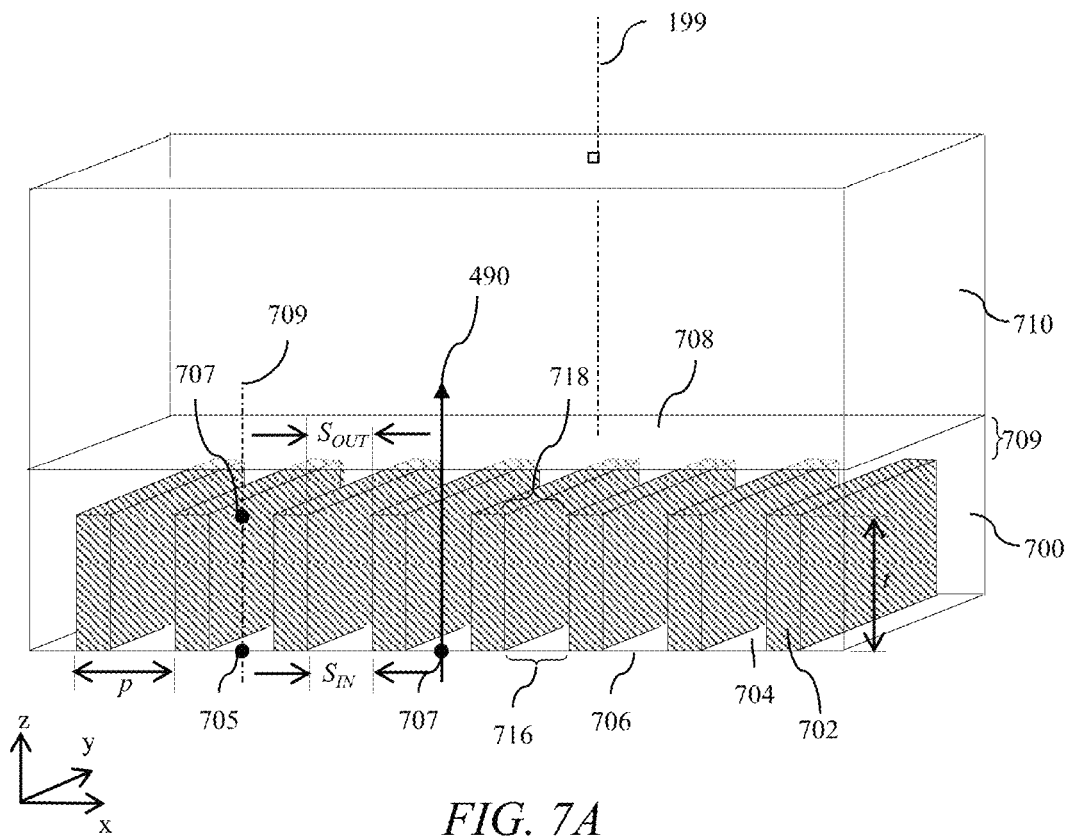
FIG. 7A is a schematic diagram illustrating in perspective side view a light control film comprising an array of transmissive regions extending between the input surface and the output surface, and absorptive regions between the transmissive regions and extend at least partway between the input surface and the output surface wherein the transmissive regions are parallel.

FIG. 7A is a schematic diagram illustrating in perspective side view a light control film 700 that comprises an input surface 706, an output surface 708 facing the input surface 706, an array of light transmissive regions 704 extending between the input surface 706 and the output surface 708, and absorptive regions 702 between the transmissive regions and extending partway between the input surface 706 and the output surface 708.

The array of transmissive regions 704 is a one-dimensional array of elongate transmissive regions 704, that are elongate in the y-axis direction.

The absorptive regions 702 between the transmissive regions 704 extend between the input surface 706 and the output surface 708. The light control film 700 is provided on a support substrate 710. The substrate 710 may be arranged on the input side 706 or the output side 708 of the light control film.

The light transmissive regions 704 are parallel sided and have surface normals in the plane of the light control film 700 such that the direction of maximum light transmission, for example ray 490 is normal to the plane of the light control film 700. The transmissive regions 704 have axes 709 defined in respect of each transmissive region 704 between centres 705, 707 of apertures 716, 718 of input and output ends 706, 708 of the transmissive regions 704 are normal to the plane (x-y plane) of the spatial light modulator 48 at all positions across the light control film 700.

In the arrangement of FIG. 7A, the light control film 700 has a transmittance that has a profile with polar angle in a direction in which the array of transmissive regions repeats (x-axis) that is centred on the normal to the plane (x-y plane) of the spatial light modulator 48 at all positions across the light control film.

In the embodiment of FIG. 7A, light absorbing region 704 do not extend between the input side and output side 706, 708 of the light control film. Rather, a layer 709 of transmissive material may be provided across the light control film. Such a layer may provide support for the light transmissive regions 704 during fabrication.

Features of the embodiment of FIG. 7A not discussed in further detail may be assumed to correspond to the features with equivalent reference numerals as discussed above, including any potential variations in the features.

An alternative structure of light control film will now be described.

Figure 7B:
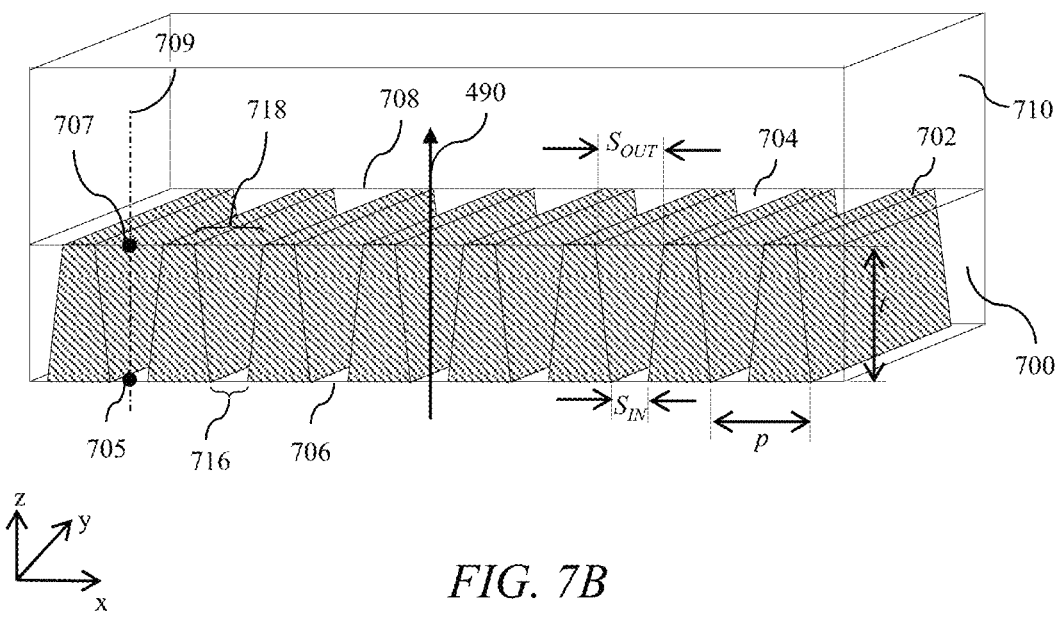
FIG. 7B is a schematic diagram illustrating in perspective side view a light control film comprising an array of transmissive regions extending between the input surface and the output surface, and absorptive regions between the transmissive regions and extend at least partway between the input surface and the output surface wherein the transmissive regions tapered.

FIG. 7B is a schematic diagram illustrating in perspective side view a light control film 700 comprising an array of transmissive regions 702 extending between the input surface 706 and the output surface 708, and absorptive regions 702 between the transmissive regions 704 and extending between the input surface 706 and the output surface 708 wherein the transmissive regions 704 tapered such that the width $S_{IN}$ of the aperture 716 on the input side is less than the width of the aperture 718 $S_{OUT}$ on the output side 708. In comparison to the light control film 700 of FIG. 7A, such an arrangement may advantageously provide increased luminance uniformity in on-axis directions as will be described further below.

Features of the embodiment of FIG. 7B not discussed in further detail may be assumed to correspond to the features with equivalent reference numerals as discussed above, including any potential variations in the features.

The optical transmission of the structures of FIGS. 7A-B will now be described.

Figure 8:
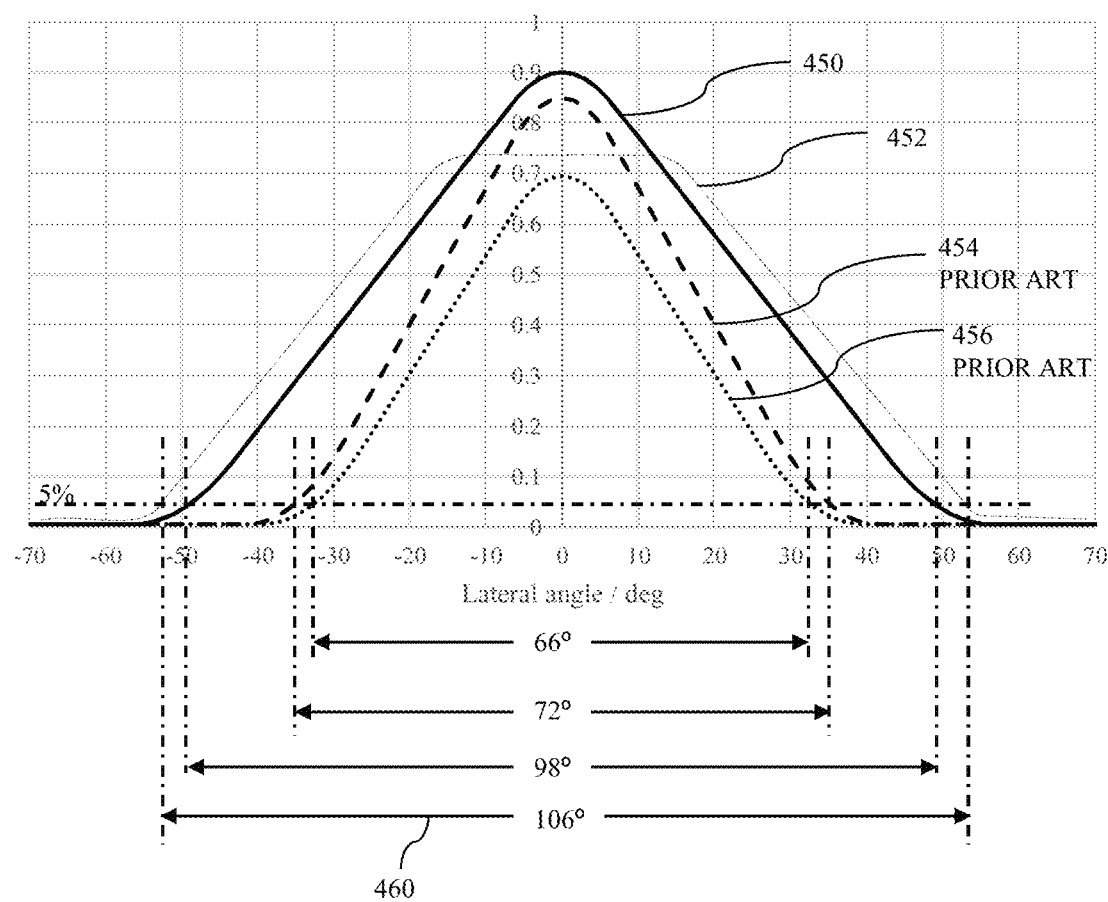
FIG. 8 is a schematic graph illustrating variation with transmission with lateral angle for light control films.

FIG. 8 is a schematic graph illustrating variation with transmission with lateral angle in the direction in which the light transmissive regions 704 repeat for various light control films 700.

Under illumination, the structure of FIG. 7A would be expected to provide a triangular profile with incident angle in the lateral angle, that is the transmission is maximum in the direction 199 that is normal to the plane of the film 700. At non-zero lateral angles some light rays that pass through the input aperture 716 of the light transmitting regions 704 is incident onto the absorbing regions 702 and so luminance falls. In an idealised non-scattering arrangement, such a profile provides a substantially triangular profile. In reality some light may be transmitted by the light absorbing regions 704. Further, scatter including that from diffraction spreads light to provide a modified triangular profile, with some rounding of profile near the axis and near the angle at which otherwise all light would be absorbed. It is convenient to describe the angular range of polar angles 460 provided by the light control film 700 using the angle at which the transmission of the film falls to 5% of the input illumination. This is different to the transmission of the film compared to the head-on transmission due to losses at the light-absorbing regions 702 for on-axis light rays.

Known non-switchable privacy displays that are provided by the user adding louver films to the front of conventional spatial light modulators will now be described.

Profile 456 is for a known prior art light control film for use in one type of non-switchable privacy display. Such a profile provides a range of polar angles 460 of 66°, that is the angle for 5% transmission. At 45°, the luminance is reduced to provide some degree of image security for use in privacy. As will be described further below, such a film for use in a non-switchable privacy display provides undesirably low image visibility to an off-axis viewer in public operation. Further such a film provides a head-on transmission of about 70%, such a loss provides undesirable loss of luminance and/or increased power consumption.

Profile 454 is for a different known prior art light control film for use in another type of non-switchable privacy display that provides a passive luminance reduction and passive reflectivity increase off-axis. Such a profile provides a range of polar angles 460 of 72°. At 45°, the luminance is reduced and reflectivity increased to provide increased image security for privacy operation. However, such a film provides undesirable off-axis luminance and off-axis reflectivity in public operation.

Profiles 450, 452 are desirable profiles for embodiments of the present disclosure. Such profiles are not desirable profiles for use in non-switchable privacy displays as they provide too high luminance at off-axis angles to achieve desirable security factors for off-axis snoopers.

Profile 450 may be provided by light transmitting regions that are parallel sided, that is $S_{OUT}=S_{IN}$ and as illustrated in FIG. 7A. Advantageously profile 450 has higher head-on transmission and tools for use in replication of the light control film 700 may be conveniently fabricated, for example by means of photoresist exposure in collimated light through a mask.

Profile 452 may be provided by light transmitting regions that are tapered, that is $S_{OUT}>S_{IN}$ and as illustrated in FIG. 7B. Advantageously profile 452 provides increased uniformity in regions close to the user viewing direction, increasing display uniformity.

Light control film 700 of the present disclosure may have a transmittance that is 5% or more in a range of polar angles in a direction in which the array of transmissive regions repeats that is at least 80° wide and may have a transmittance that is 5% or more in a range of polar angles in a direction in which the array of transmissive regions repeats that is at least 90° wide.

Further the light control film 700 may have a transmittance that is 5% or more in a range of polar angles in a direction in which the array of transmissive regions repeats that is at most 130° wide.

The absorptive regions 702 of the light control film 700 may have a thickness, t, wherein t is given by the expression:

$$t=(S_{IN}-S_{IN}^2/10p+S_{OUT})/(2*\tan(a\,\sin(\xi/n))) \qquad \text{eqn. 14}$$

where $S_{IN}$ is a width of an aperture 716 of the input end 706 of the absorptive regions, $S_{OUT}$ is a width of an aperture 718 of the output end of the absorptive regions 702, p is a pitch of the transmissive regions 704 in the direction in which the array of transmissive regions repeats, and n is the refractive index of the transmissive regions; wherein $\xi$ may be 0.643 or more or $\xi$ may be 0.707 or more. Further $\xi$ may be 0.906 or less.

In an exemplary embodiment a light control film 700 such that illustrated in FIG. 7A provides a profile 450 with a range of polar angles 460 of 98° (for which $\xi=0.755$), with a transmission of greater than 15% at 45°. Such a profile advantageously achieves high transmission efficiency head-on.

In a further exemplary embodiment a light control film 700 such that illustrated in FIG. 7B provides a profile 452 with a range of polar angles 460 of 106° (for which $\xi=0.799$), with a transmission of greater than 20% at 45°. Such a profile advantageously achieves an extended region of uniform transmission near on-axis directions. Desirably the uniformity of the display as seen by the head-on user may be increased in comparison to profile 450.

The thickness 706 of the layer 700, and width of louvres 702, 704 is selected to provide an absorption at 45 degrees in at least one azimuthal orientation that is between 2% and 30% of the absorption in the direction normal to the light control film, preferably between 4% and 20% of the absorption in the direction normal to the light control film and most preferably between 6% and 10% of the absorption in the direction normal to the light control film 700.

The operation of the displays of FIGS. 1-6 in privacy and public modes of operation will now be described in overview.

Figure 9A:
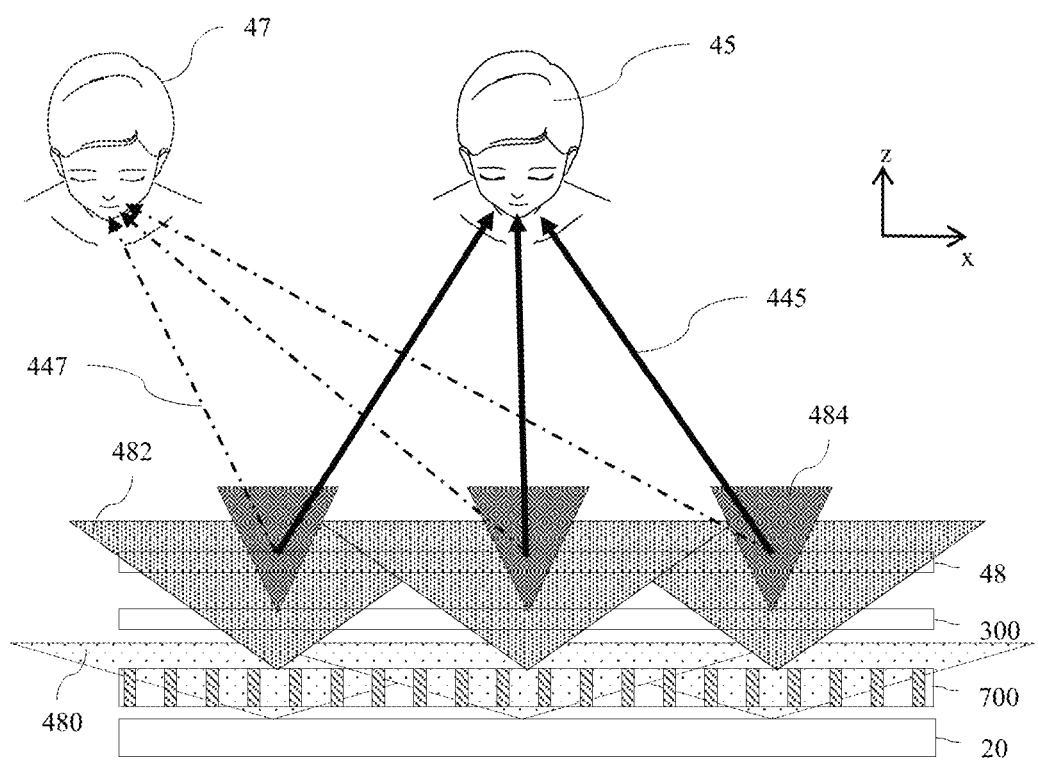
FIG. 9A is a schematic diagram illustrating in top view the operation of the display apparatus of FIG. 1 in a privacy mode of operation.
Figure 9B:
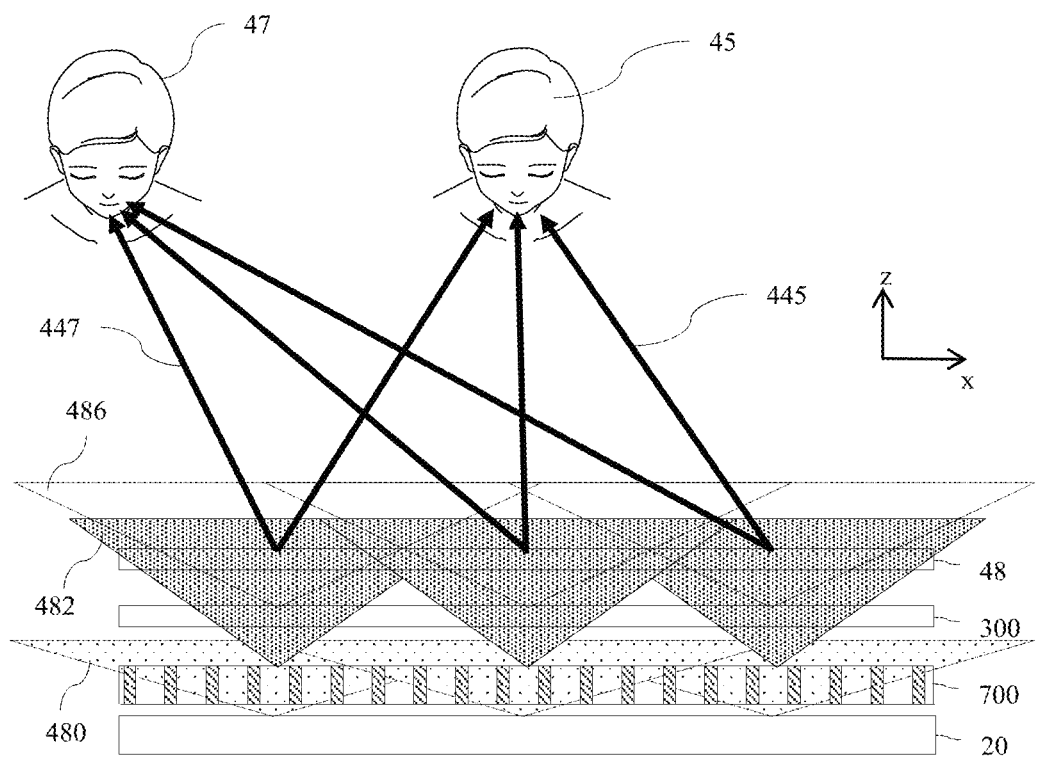
FIG. 9B is a schematic diagram illustrating in top view the operation of the display apparatus of FIG. 1 in a public mode of operation.

FIG. 9A is a schematic diagram illustrating in top view the operation of the display apparatus of FIG. 1 in a privacy mode of operation; and FIG. 9B is a schematic diagram illustrating in top view the operation of the display apparatus of FIG. 1 in a public mode of operation. Features of the embodiments of FIGS. 9A-B not discussed in further detail may be assumed to correspond to the features with equivalent reference numerals as discussed above, including any potential variations in the features.

Light cone 480 is output from backlight 20 (or emissive spatial light modulator 48) and directed through light control film 700 with transmission light cone 482 that is narrower than the cone 480.

In FIG. 9A, the polar control retarder 300 is arranged to reduce off-axis luminance, with cone size 484. Head-on observer 45 sees light rays 445 from across the display with high luminance and high image visibility. Off-axis snooper 47 sees light rays 447 from across the display with reduced luminance and increased image security. Some regions of the display that are closer to the snooper 47 may undesirably have higher luminance.

In a public mode of operation as illustrated in FIG. 9B the cone width 486 is substantially increased and both users can see light from across the display with high image visibility within the transmission cone 482 of the light control film 700 and backlight 20.

Illustrative embodiments of a switchable privacy display will now be described. In the present illustrative embodiments, the field of view 600 as seen by user 45 in a plane at 500 mm and a lateral angle of 0 degrees from a 14″ landscape display will be marked and the field of view 602 as seen by user 47 in a plane at 700 mm from the display and at a lateral angle of 45 degrees are illustrated.

FIG. 10A is a schematic graph illustrating the variation with direction of luminance for a backlight 20 comprising crossed brightness enhancement films such as that illustrated in FIG. 1. FIG. 10B is a schematic graph illustrating the variation with direction of luminance for a backlight comprising a light control film 700 that has a transmittance that is 5% or more in a range of polar angles 460 in a direction in which the array of transmissive regions 704 repeat that is 100° (for which ξ=0.766).

An illustrative embodiment of polar control retarder 300 will now be given.

FIG. 10C is a schematic graph illustrating the variation with direction of transmission of a polar control retarder of FIG. 1 for the illustrative embodiment of the arrangement is given in TABLE 1; and FIG. 10D is a schematic graph illustrating the variation with direction of reflectivity of a polar control retarder of FIG. 1 for the illustrative embodiment of the arrangement is given in TABLE 1 wherein the display 100 further comprises a reflective polariser 302.

TABLE 1

| Alignment type | LC layer 314 retardance | Passive retarder 330 type | Passive retarder 330 retardance |
|---|---|---|---|
| Homogeneous Homeotropic | 1000 nm | | |
| | | Negative C-plate | −800 nm |

FIG. 11 is a schematic graph illustrating the variation with direction of Fresnel reflection of a single surface in air. Such reflections are included in calculations of Security Factor, S and Image Visibility, W for both public and privacy modes of operation.

Further non-limiting alternatives of polarisation control retarder 300 will now be described.

In one alternative, the switchable liquid crystal retarder 301 may comprise two surface alignment layers disposed adjacent to the layer 413 of liquid crystal material 414 and on opposite sides thereof and each arranged to provide homeotropic alignment in the adjacent liquid crystal material. The layer 413 of liquid crystal material 414 of the switchable liquid crystal retarder 301 may comprise a liquid crystal material with a negative dielectric anisotropy. The layer 413 of liquid crystal material 414 may have a retardance for light of a wavelength of 550 nm in a range from 500 nm to 1000 nm, preferably in a range from 600 nm to 900 nm and most preferably in a range from 700 nm to 850 nm.

Where two surface alignment layers providing homeotropic alignment are provided, the at least one passive compensation retarder 330 may comprise a retarder having its optical axis perpendicular to the plane of the retarder, the at least one passive retarder having a retardance for light of a wavelength of 550 nm in a range from −300 nm to −900 nm, preferably in a range from −450 nm to −800 nm and most preferably in a range from −500 nm to −725 nm.

Alternatively, where two surface alignment layers providing homeotropic alignment are provided, the at least one passive compensation retarder 330A, 330B may comprise a pair of retarders which have optical axes in the plane of the retarders that are crossed, each retarder of the pair of retarders having a retardance for light of a wavelength of 550 nm in a range from 300 nm to 800 nm, preferably in a range from 500 nm to 700 nm and most preferably in a range from 550 nm to 675 nm. Advantageously, in this case increased field of view in wide angle mode of operation may be provided. Further, zero voltage operation in wide angle mode of operation may be provided, reducing power consumption.

In another alternative, the switchable liquid crystal retarder 301 may comprise two surface alignment layers disposed adjacent to the layer 413 of liquid crystal material 414 and on opposite sides thereof and each arranged to provide homogeneous alignment in the adjacent liquid crystal material. Advantageously in comparison to homeotropic alignment on opposite sides of the liquid crystal, increased resilience to the visibility of flow of liquid crystal material during applied pressure may be achieved.

The layer 413 of liquid crystal material 414 of the switchable liquid crystal retarder 301 may comprise a liquid crystal material with a positive dielectric anisotropy. The layer 413 of liquid crystal material 414 may have a retardance for light of a wavelength of 550 nm in a range from 500 nm to 900 nm, preferably in a range from 600 nm to 850 nm and most preferably in a range from 700 nm to 800 nm.

Where two surface alignment layers providing homogeneous alignment are provided, the at least one passive compensation retarder 330 may comprise a retarder having its optical axis perpendicular to the plane of the retarder, the at least one passive retarder having a retardance for light of a wavelength of 550 nm in a range from −300 nm to −700 nm, preferably in a range from −350 nm to −600 nm and most preferably in a range from −400 nm to −500 nm.

Alternatively, where the two surface alignment layers providing homogeneous alignment are provided, the at least one passive compensation retarder 330A, 330B may comprise a pair of retarders which have optical axes in the plane of the retarders that are crossed, each retarder of the pair of retarders having a retardance for light of a wavelength of 550 nm in a range from 300 nm to 800 nm, preferably in a range from 350 nm to 650 nm and most preferably in a range from 450 nm to 550 nm. Advantageously, in this case increased resilience to the visibility of flow of liquid crystal material during applied pressure may be achieved.

In another alternative, the switchable liquid crystal retarder 301 may comprise two surface alignment layers disposed adjacent to the layer 413 of liquid crystal material 414 and on opposite sides thereof, one of the surface alignment layers being arranged to provide homeotropic alignment in the adjacent liquid crystal material and the other of the surface alignment layers being arranged to provide homogeneous alignment in the adjacent liquid crystal material.

When the surface alignment layer arranged to provide homogeneous alignment is between the layer 413 of liquid crystal material 414 and the compensation retarder 330, the layer 413 of liquid crystal material 414 may have a retardance for light of a wavelength of 550 nm in a range from 700 nm to 2000 nm, preferably in a range from 1000 nm to 1500 nm and most preferably in a range from 1200 nm to 1500 nm.

When the surface alignment layer arranged to provide homogeneous alignment is between the layer 413 of liquid crystal material 414 and the compensation retarder 330, the at least one passive compensation retarder 330 may comprise a retarder having its optical axis perpendicular to the plane of the retarder, the at least one passive retarder having a retardance for light of a wavelength of 550 nm in a range from −400 nm to −1800 nm, preferably in a range from −700 nm to −1500 nm and most preferably in a range from −900 nm to −1300 nm.

When the surface alignment layer arranged to provide homogeneous alignment is between the layer 413 of liquid crystal material 414 and the compensation retarder 330A, 330B, the at least one passive compensation retarder 330A, 330B may comprise a pair of retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

When the surface alignment layer arranged to provide homeotropic alignment is between the layer 413 of liquid crystal material 414 and the compensation retarder 330, the layer 413 of liquid crystal material 414 may have a retardance for light of a wavelength of 550 nm in a range from 500 nm to 1800 nm, preferably in a range from 700 nm to 1500 nm and most preferably in a range from 900 nm to 1350 nm.

When the surface alignment layer arranged to provide homeotropic alignment is between the layer 413 of liquid crystal material 414 and the compensation retarder 330, the at least one passive compensation retarder 330 may comprise a retarder having its optical axis perpendicular to the plane of the retarder, the at least one passive retarder having a retardance for light of a wavelength of 550 nm in a range from −300 nm to −1600 nm, preferably in a range from −500 nm to −1300 nm and most preferably in a range from −700 nm to −1150 nm.

When the surface alignment layer arranged to provide homeotropic alignment is between the layer 413 of liquid crystal material 414 and the compensation retarder 330A, 330B, the at least one passive compensation retarder 330A, 330B may comprise a pair of retarders which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm. Advantageously, in this case increased resilience to the visibility of flow of liquid crystal material during applied pressure may be achieved.

Each alignment layer may have a pretilt having a pretilt direction with a component in the plane of the liquid crystal layer that is parallel or anti-parallel or orthogonal to the electric vector transmission direction of the display polariser. Advantageously a display may be provided with narrow viewing angle in a lateral direction and a wide viewing freedom for display rotation about a horizontal axis. Such a display may be comfortable to view for a head-on display user and difficult to view for an off-axis display user.

The at least one passive retarder may comprise at least two passive retarders with at least two different orientations of optical axes which may have optical axes in the plane of the retarders that are crossed. Field of view for liquid crystal retarders with homogeneous alignment is increased while providing resilience to the visibility of flow of liquid crystal material during applied pressure.

The pair of passive retarders may have optical axes that extend at 45° and at 135°, respectively, with respect to an electric vector transmission direction that is parallel to the electric vector transmission of the display polariser. The passive retarders may be provided using stretched films to advantageously achieve low cost and high uniformity.

The switchable liquid crystal retarder 301 may be provided between the pair of passive retarders. Advantageously the thickness and complexity of the plural retarders may be reduced.

A transparent electrode and a liquid crystal alignment layer may be formed on a side of each of the pair of passive retarders adjacent the switchable liquid crystal retarder 301; and may further comprise first and second substrates between which the switchable liquid crystal retarder 301 is provided, the first and second substrates each comprising one of the pair of passive retarders, wherein each of the pair of passive retarders has a retardance for light of a wavelength of 550 nm in a range from 150 nm to 800 nm, preferably in a range from 200 nm to 700 nm and most preferably in a range from 250 nm to 600 nm.

In one alternative, the at least one passive compensation retarder 330 may comprise a retarder having an optical axis perpendicular to the plane of the retarder. Advantageously the thickness and complexity of the passive retarder stack may be reduced.

The at least one passive compensation retarder 330A, 330B may comprise two passive retarders having an optical axis perpendicular to the plane of the passive retarders, and the switchable liquid crystal retarder 301 is provided between the two passive retarders. Advantageously the thickness and complexity of the plural retarders may be reduced. High head-on efficiency may be achieved in both wide and privacy modes, a wide field of view for wide angle mode and snoopers may be unable to perceive image data from a wide range of off-axis viewing locations.

A transparent electrode and a liquid crystal alignment layer may be formed on a side of each of the two passive retarders adjacent the switchable liquid crystal retarder 301. First and second substrates between which the switchable liquid crystal retarder 301 may be provided, the first and second substrates each comprising one of the two passive retarders. The two passive retarders may have a total retardance for light of a wavelength of 550 nm in a range from −300 nm to −700 nm, preferably in a range from −350 nm to −600 nm and most preferably in a range from −400 nm to −500 nm.

In another alternative, the at least one passive compensation retarder 330 may comprise a retarder having an optical axis with a component perpendicular to the plane of the retarder and with a component in the plane of the retarder. Advantageously fields of view in wide angle mode may be increased and snoopers may be unable to perceive image data from a wide range of off-axis viewing locations.

The component in the plane of the passive retarder may extend at 0°, with respect to an electric vector transmission direction that is parallel or perpendicular to the electric vector transmission of the display polariser. The at least one passive retarder may further comprise a passive retarder having an optical axis perpendicular to the plane of the passive retarder or a pair of passive retarders which have optical axes in the plane of the passive retarders that are crossed.

The retardance of the at least one passive compensation retarder 330 may be equal and opposite to the retardance of the switchable liquid crystal retarder 301.

The switchable liquid crystal retarder 301 may comprise first and second pretilts; and the at least one passive compensation retarder 330 may comprise a compensation retarder 330 with first and second pretilts, the first pretilt of the compensation retarder 330 being the same as the first pretilt of the liquid crystal retarder and the second pretilt of the compensation retarder 330 being the same as the second pretilt of the liquid crystal retarder.

The switchable liquid crystal retarder 301 may further comprise electrodes arranged to apply a voltage for controlling the layer 413 of liquid crystal material 414. The electrodes may be on opposite sides of the layer 413 of liquid crystal material 414. The display may be switched by control of the liquid crystal layer, advantageously achieving a switchable privacy display, or other display with reduced off-axis stray light. The display may further comprise a control system arranged to control the voltage applied across the electrodes of the at least one switchable liquid crystal retarder 301.

The output of display 100 comprising the components of FIGS. 10A-D will now be described.

Figure 12:
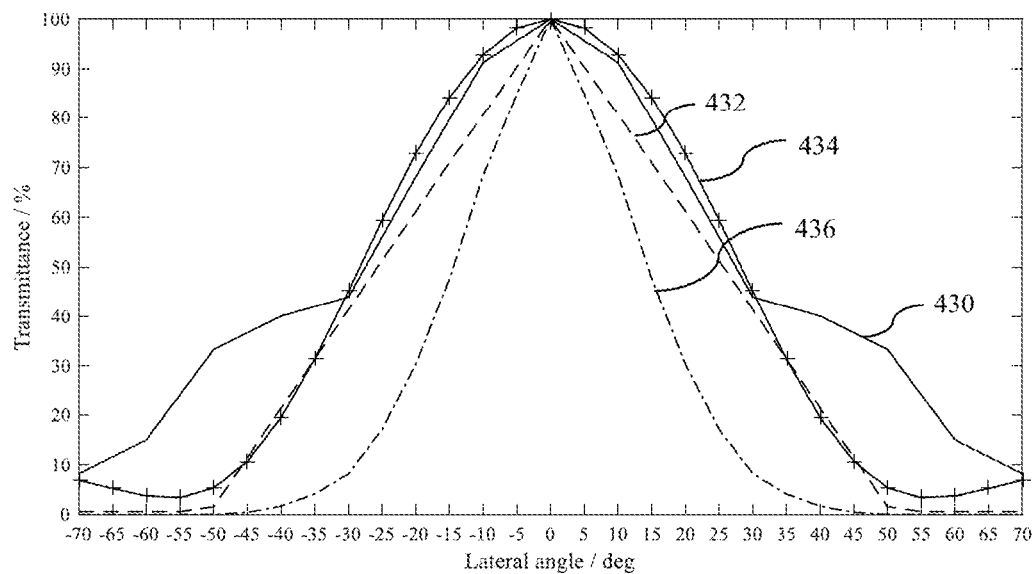
FIG. 12 is a schematic graph illustrating variation of luminance with lateral angle for a display of the type illustrated in FIG. 1, the backlight profile of FIG. 10A, and the transmission profiles of FIG. 10B and FIG. 10C for the display in privacy mode of operation.

FIG. 12 is a schematic graph illustrating variation of normalised luminance with lateral angle for a display of the type illustrated in FIG. 1, the backlight profile of FIG. 10A, and the transmission profiles of FIG. 10B and FIG. 10C. Profile 430 is the lateral variation of backlight luminance of FIG. 10A. Profile 432 is the lateral variation of light control film 700 transmittance of FIG. 10B. Profile 434 is the variation of the polar control retarder of FIG. 10C in privacy mode of operation. Profile 436 is the resultant profile of display 100 output luminance in privacy mode of operation.

Figure 13:
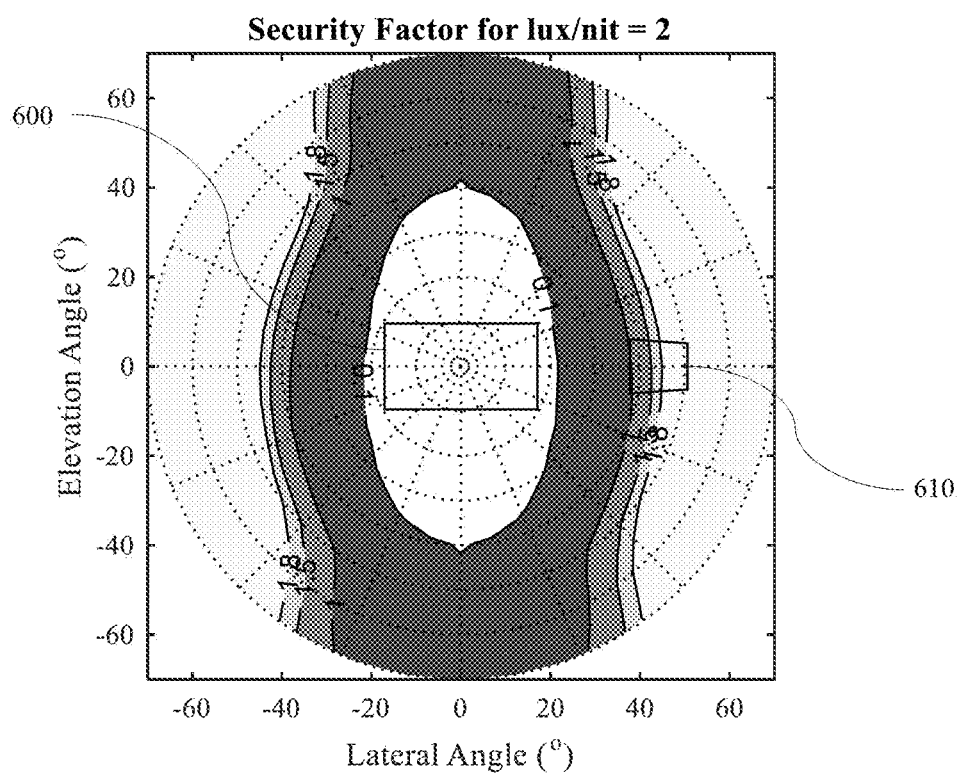
FIG. 13 is a schematic graph illustrating the variation with direction of security factor, S in privacy mode for a display of the type illustrated in FIG. 1, comprising the backlight profile of FIG. 10A, the transmission profiles of FIG. 10B and FIG. 10C, the reflection profile of FIG. 10D and for a display head-on luminance, of value $Y_{max}$ measured in nits that is half of the illuminance of value I measured in lux.

FIG. 13 is a schematic graph illustrating the variation with direction of security factor, S in privacy mode for a display of the type illustrated in FIG. 1, comprising the backlight profile of FIG. 10A, the transmission profiles of FIG. 10B and FIG. 10C, the reflection profile of FIG. 10D and for a display head-on luminance, of value $Y_{max}$ measured in nits that is half of the illuminance of value I measured in lux. The head-on observer 45 has a field of view 600 that provides high image visibility (S<0.1) across the whole of the display. Advantageously a bright and easily read image is seen. The off-axis user 47 has a field of view 610 for which advantageously all image data is private (S≥1.0) and some of the display is invisible for all image data (S≥1.8).

Figure 14:
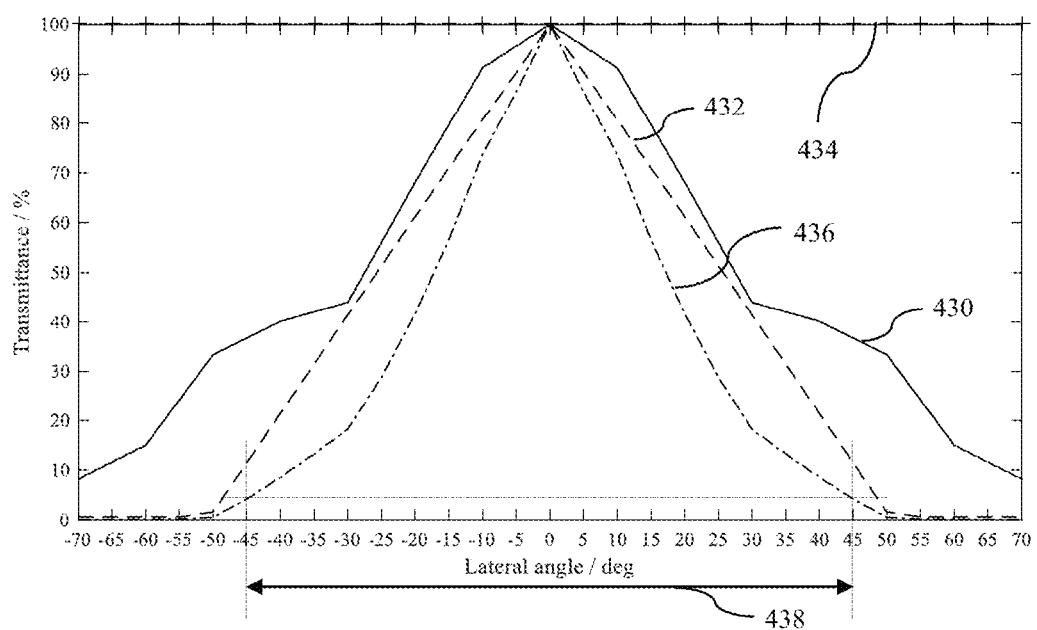
FIG. 14 is a schematic graph illustrating variation of luminance with lateral angle for a display of the type illustrated in FIG. 1, the backlight profile of FIG. 10A, and the transmission profile of FIG. 10B for the display in public mode of operation.

FIG. 14 is a schematic graph illustrating variation of normalised luminance with lateral angle for a display of the type illustrated in FIG. 1, the backlight profile of FIG. 10A, and the transmission profiles of FIG. 10B and FIG. 10C. Profile 430 is the lateral variation of backlight luminance of FIG. 10A. Profile 432 is the lateral variation of light control film 700 transmittance of FIG. 10B. Profile 434 is the variation of a polar control retarder in public mode of operation. Profile 436 is the resultant profile of display 100 output luminance in public mode of operation. The display 100 achieves an angular width 438 of 90° for which the luminance is 5% or greater of the head-on luminance.

Figure 15:
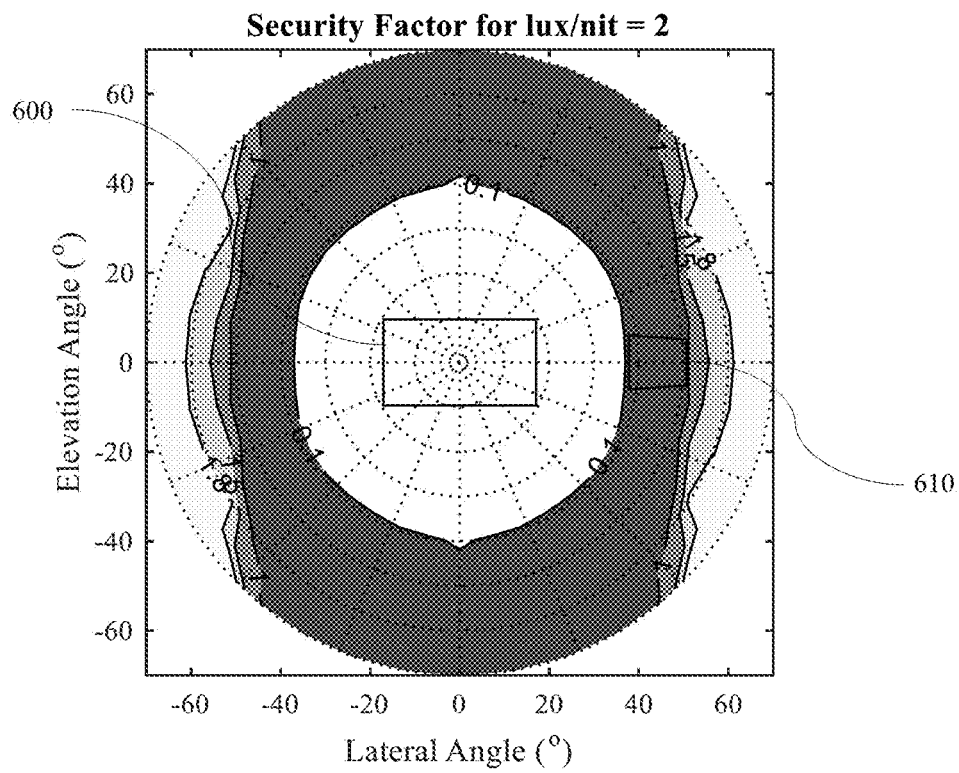
FIG. 15 is a schematic graph illustrating the variation with direction of security factor, S in public mode for a display of the type illustrated in FIG. 1, comprising the backlight profile of FIG. 10A, the transmission profile of FIG. 10B, the reflection profile of FIG. 11, and for a display head-on luminance, of value $Y_{max}$ measured in nits that is half of the illuminance of value I measured in lux.

FIG. 15 is a schematic graph illustrating the variation with direction of security factor, S in public mode for a display of the type illustrated in FIG. 1, comprising the backlight profile of FIG. 10A, the transmission profile of FIG. 10B, the reflection profile of FIG. 11, and for a display head-on luminance, of value $Y_{max}$ measured in nits that is half of the illuminance of value I measured in lux. The head-on observer 45 has a field of view 600 that provides high image visibility (S<0.1) across the whole of the display. Advantageously a bright and easily read image is seen. The off-axis user 47 has a field of view 610 for which advantageously no image data is invisible (S<1.0). Advantageously data can be shared by multiple users.

The operation of a prior art non-switchable privacy display will now be described.

Figure 16:
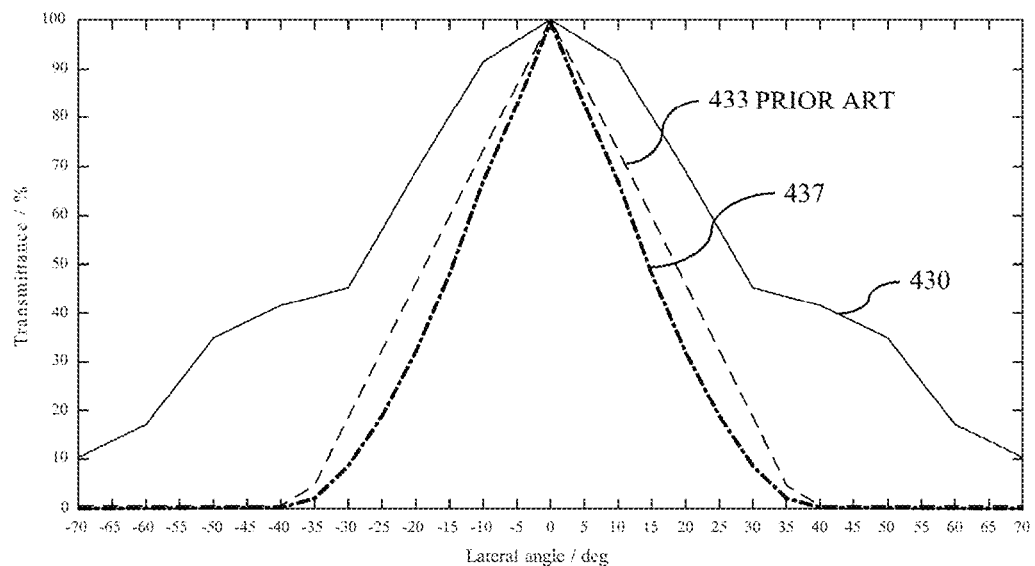
FIG. 16 is a schematic graph illustrating variation of luminance and transmission with lateral angle for a prior art non-switchable privacy display.

FIG. 16 is a schematic graph illustrating variation of luminance and transmission with lateral angle for an exemplary prior art non-switchable privacy display. Said prior art display may be provided by a backlight with the same luminance profile as FIG. 10A and lateral luminance profile 430. Attached to the output of said display by the user is a prior art light control film with a transmittance that is 5% or more in a range of polar angles in a direction in which the array of transmissive regions repeats that is 70° wide. The output luminance profile of said prior art display is illustrated by profile 437.

Figure 17:
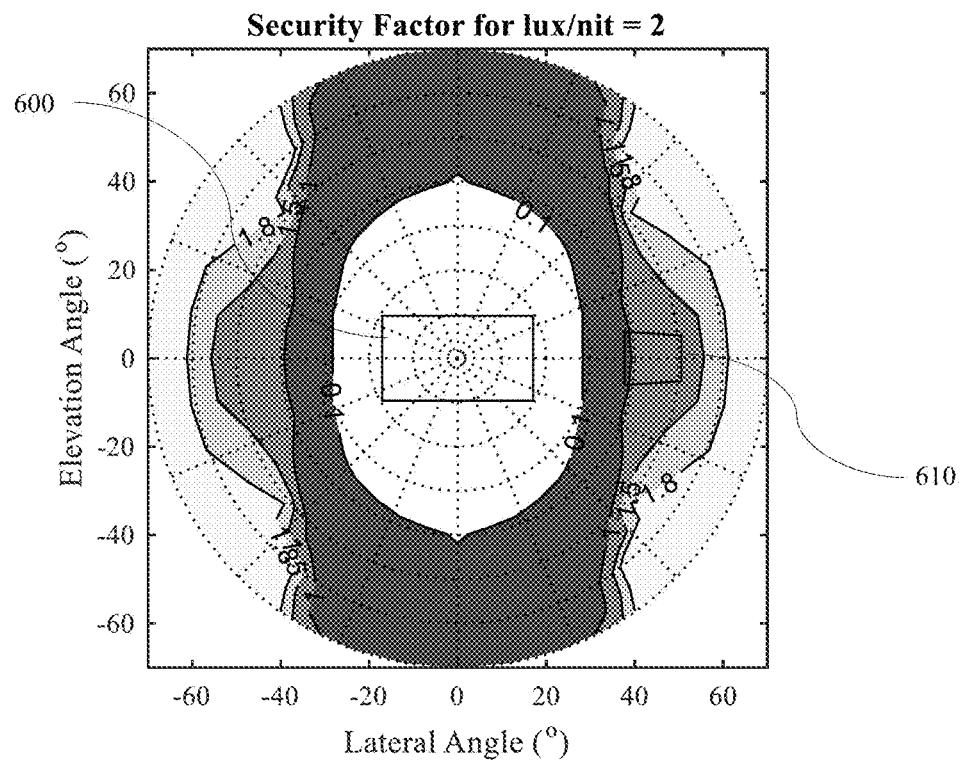
FIG. 17 is a schematic graph illustrating the variation with direction of security factor, S in for a prior art non-switchable privacy display, comprising the backlight profile of FIG. 10A, and the transmission profile of a light control film comprising a lateral width of 70° at which the transmission is 5% of the head-on transmission, and the reflection profile of FIG. 11 for a display head-on luminance, of value $Y_{max}$ measured in nits that is half of the illuminance of value I measured in lux.

FIG. 17 is a schematic graph illustrating the variation with direction of security factor, S in for a prior art non-switchable privacy display, comprising the backlight profile of FIG. 10A, the transmission profile of a light control film comprising a lateral width of 70° at which the transmission is 5% of the head-on transmission, and the front surface reflection profile of FIG. 11 for a display head-on luminance, of value $Y_{max}$ measured in nits that is half of the illuminance of value I measured in lux.

Such a display has a single mode of operation, such that the display characteristics are fixed. Considering the off-axis snooper field of view 610, when it is desirable to hide off-axis information such a display achieves a privacy level S>1.0, however some types of image data is visible across the display as S<1.5. Advantageously by way of comparison the present embodiments in FIG. 13 achieve increased image security and image invisibility for off-axis snoopers.

Considering the off-axis user field of view 610, when it is desirable to show off-axis information, however some types of image data content is invisible across the display as S>1.0. Advantageously by way of comparison the present embodiments in FIG. 15 achieve increased image visibility for off-axis users.

In other words, light control film 700 of the present embodiments with a transmittance that is 5% or more in a range of polar angles in a direction in which the array of transmissive regions repeats that is 80° wide (ξ>0.643) can achieve increased image visibility in public mode and increased image security in privacy mode in comparison to the prior art display.

It would be desirable to increase the luminance and security level uniformity of a privacy display.

Figure 18:
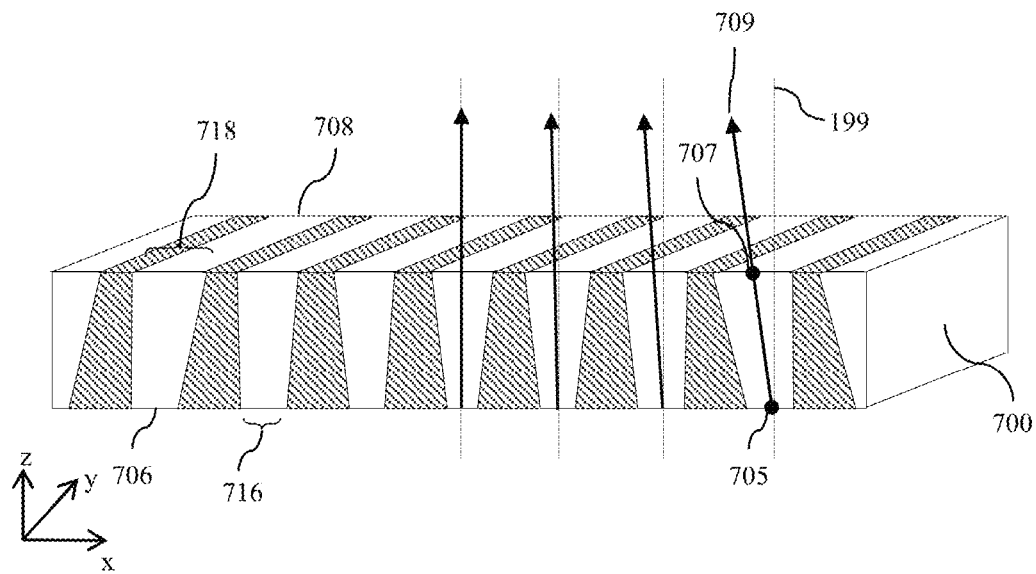
FIG. 18 is a schematic diagram illustrating in perspective side view a light control film comprising an array of transmissive regions extending between the input surface and the output surface, and absorptive regions between the transmissive regions and extend at least partway between the input surface and the output surface wherein the transmissive regions tapered, wherein the transmissive regions are tilted so that axes defined in respect of each transmissive region between centres of apertures of input and output ends of the transmissive regions are directed inwardly towards an optical axis extending forwardly from the centre of the spatial light modulator.
Figure 19:
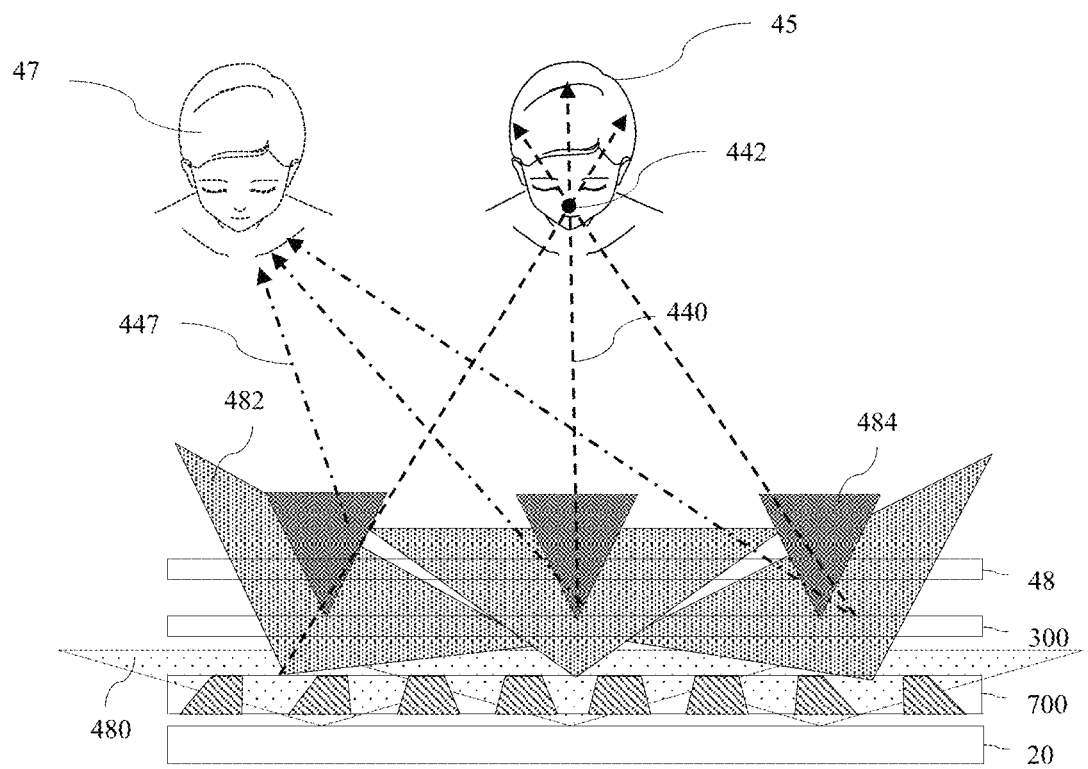
FIG. 19 is a schematic diagram illustrating in top view the operation of a display apparatus of FIG. 1 comprising the light control film of FIG. 18 in a privacy mode of operation.

FIG. 18 is a schematic diagram illustrating in perspective side view a light control film 700 for a display device 100 of the present embodiments; and FIG. 19 is a schematic diagram illustrating in top view the operation of a display apparatus of FIG. 1 comprising the light control film of FIG. 18 in a privacy mode of operation.

The light control film 700 comprises an array of transmissive regions 704 extending between the input surface 706 and the output surface 708, and absorptive regions 702 between the transmissive regions. Absorptive regions 704 extend between the input surface 706 and the output surface 708 wherein the transmissive regions 704 are tapered. The transmissive regions 702 are tilted so that axes 709 defined in respect of each transmissive region 704 between centres 705, 707 of apertures 716, 718 of input and output ends of the transmissive regions 704 are directed inwardly towards an optical axis 440 extending forwardly from the centre of the spatial light modulator 48.

In other words the light control film 700 has a transmittance that has profiles with polar angle in a direction in which the array of transmissive regions repeats that have centre lines 709 directed inwardly towards an optical axis 440 extending forwardly from the centre of the spatial light modulator 448. Said centre lines 709 of said profiles are directed towards a common point 442.

The transmissive regions 704 are tilted so that axes 709 defined in respect of each transmissive region 704 between centres 705, 707 of apertures 716, 718 of input and output ends 706, 708 of the transmissive regions 704 are directed inwardly towards an optical axis 709 extending forwardly from the centre of the spatial light modulator 48 and said axes are directed towards a common point 442.

In comparison to the arrangement of FIG. 9A, light cones 482 are thus tilted towards the head-on user for image points across the display in the direction in which the transmissive regions 704 repeat. The centre of the light cones 482 are directed towards the user 45 and thus the uniformity of the image seen is increased, as roll-offs in the profile due to the transmission of the profile 432 of FIG. 14 for example are less visible or not visible. Advantageously display uniformity is increased. Further the off-axis snooper sees increased uniformity at low light levels for points across the display, increasing the uniformity of the security factor S, in comparison to that illustrated by field of view 610 in FIG. 13. Advantageously increased image security is achieved.

Further such a pupillation of light towards the point 442 is achieved by the tapered light transmission regions, achieving increased uniformity of illumination. Such tapers may be pupillated without surfaces that overhang, providing a tool that may be suitable for replication of the light transmissive regions 704.

Features of the embodiment of FIG. 18 and FIG. 19 not discussed in further detail may be assumed to correspond to the features with equivalent reference numerals as discussed above, including any potential variations in the features.

Embodiments comprising curved light control film 700 to improve luminance uniformity and security factor uniformity will now be described.

Figure 20:
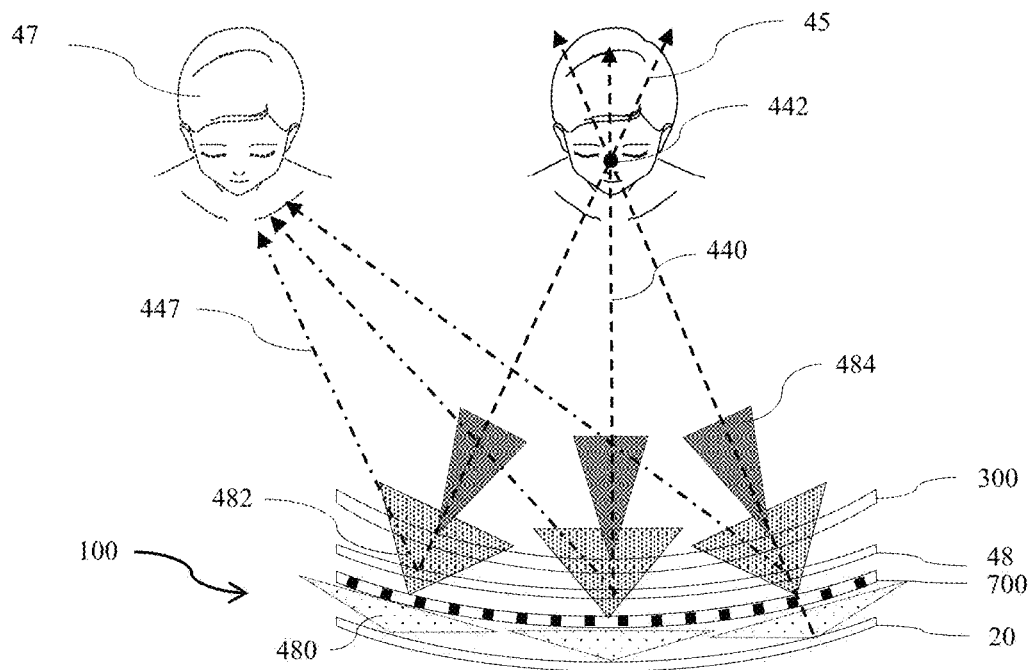
FIG. 20 is a schematic diagram illustrating in top view a display apparatus comprising a curved transmissive spatial light modulator, curved backlight, curved plural retarders and curved light control film.
Figure 21:
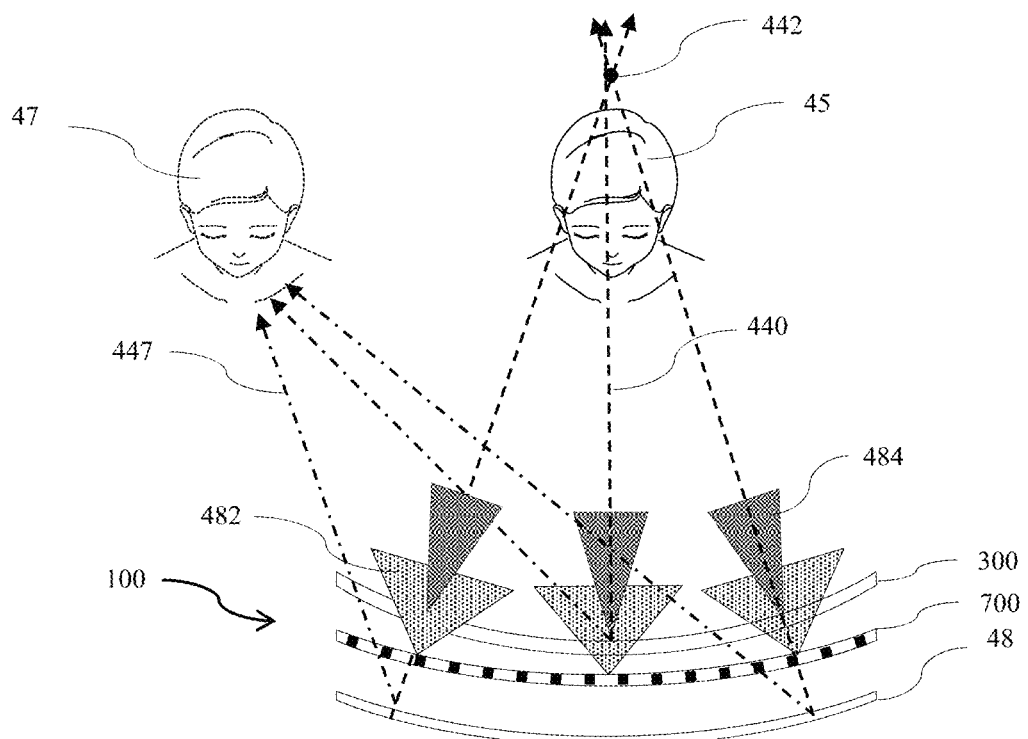
FIG. 21 is a schematic diagram illustrating in top view a display apparatus comprising a curved emissive spatial light modulator, curved plural retarders and a curved light control film.

FIG. 20 is a schematic diagram illustrating in top view a display apparatus comprising a curved transmissive spatial light modulator 48, curved backlight 20, curved polar control retarder 300 and curved light control film 700; and FIG. 21 is a schematic diagram illustrating in top view a display apparatus comprising a curved emissive spatial light modulator 48, curved polar control retarder and a curved light control film 700.

Light from image points across the display 100 are directed towards a common point 442 by means of the curvature of the respective elements. The common point 442 may be at the nominal viewing distance for observer 45 as illustrated in FIG. 20 or as an alternative may be at a different distance. Preferably the distance is the same or greater than the nominal viewing distance as illustrated in FIG. 21.

In comparison to the arrangement of FIG. 9A, light cones 480, 482, 484 are tilted towards the head-on user 45 across the display. Variations in the luminance profiles 430, 432, 434 of FIG. 14 for example (and corresponding front reflectivity profile when reflective polariser 302 is provided) are less visible or not visible across the display. Advantageously display uniformity is increased. Further the off-axis snooper sees increased uniformity of luminance at low light levels (and uniformity of reflectivity when reflective polariser 302 is provided) for points across the display device 100, increasing the uniformity of the security factor S, in comparison to that illustrated by field of view 610 in FIG. 13. Advantageously increased image security is achieved.

Features of the embodiment of FIGS. 20-21 not discussed in further detail may be assumed to correspond to the features with equivalent reference numerals as discussed above, including any potential variations in the features.

The principles of operation of the switchable polar control retarders of FIG. 1 will now be described.

Figure 22A:
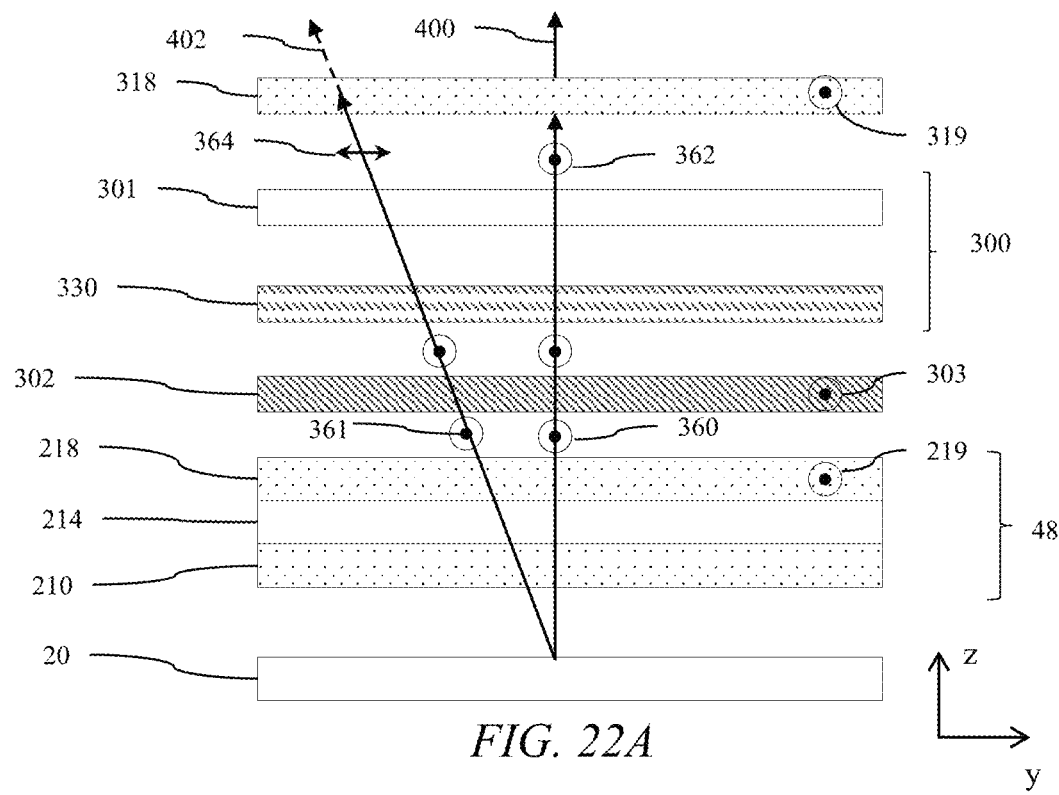
FIG. 22A is a schematic diagram illustrating in side view propagation of output light from a spatial light modulator through the optical stack of FIG. 1 in a privacy mode of operation.

FIG. 22A is a schematic diagram illustrating in side view propagation of output light from a spatial light modulator through the optical stack of FIG. 1 in a privacy mode of operation.

When the layer 314 of liquid crystal material 414 is driven to operate in the privacy mode, the retarders 300 provide no overall transformation of polarisation component 360 to output light rays 400 passing therethrough along an axis perpendicular to the plane of the switchable retarder, but provides an overall transformation of polarisation component 361 to light rays 402 passing therethrough for some polar angles which are at an acute angle to the perpendicular to the plane of the retarders.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the retarders 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

The polar distribution of light transmission illustrated in FIG. 10A modifies the polar distribution of luminance output of the underlying spatial light modulator 48. In the case that the spatial light modulator 48 comprises a directional backlight 20 then off-axis luminance may be further be reduced as described above.

Features of the embodiment of FIG. 22A not discussed in further detail may be assumed to correspond to the features with equivalent reference numerals as discussed above, including any potential variations in the features.

Advantageously, a privacy display is provided that has low luminance to an off-axis snooper while maintaining high luminance for an on-axis observer.

The operation of the reflective polariser 302 for light from ambient light source 604 will now be described for the display operating in privacy mode.

Figure 22B:
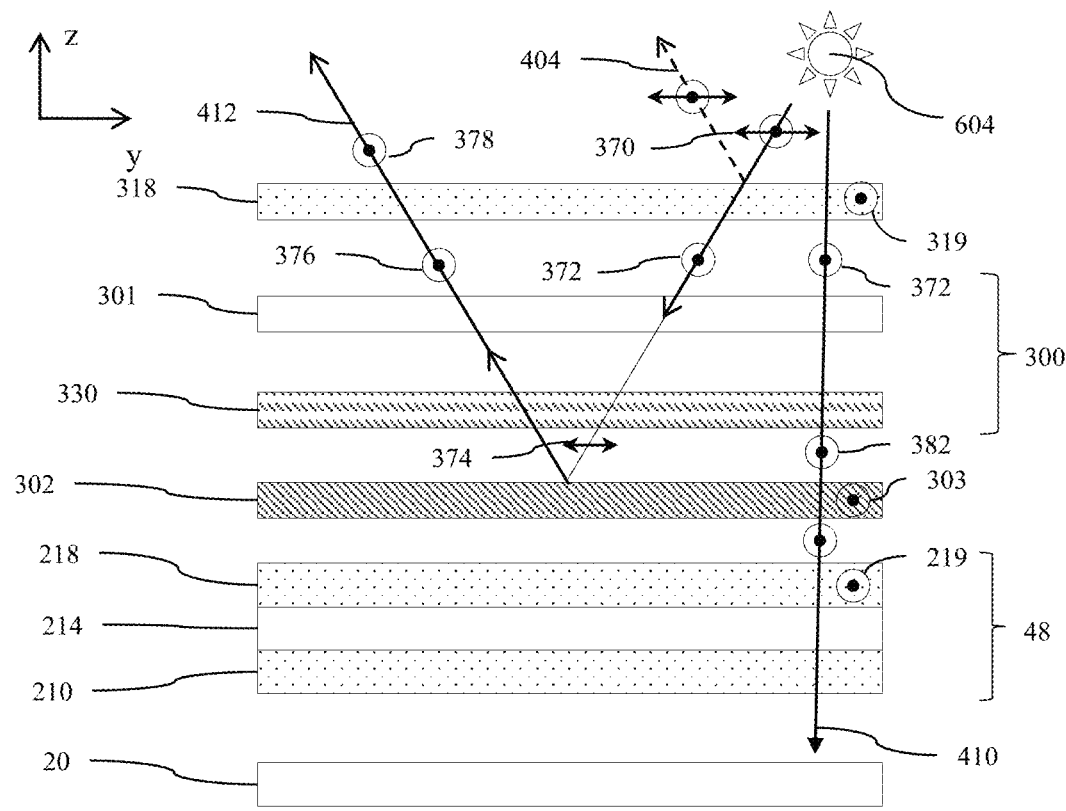
FIG. 22B is a schematic diagram illustrating in top view propagation of ambient illumination light through the optical stack of FIG. 1 in a privacy mode of operation.

FIG. 22B is a schematic diagram illustrating in top view propagation of ambient illumination light through the optical stack of FIG. 1 in a privacy mode of operation.

Ambient light source 604 illuminates the display device 100 with unpolarised light. Additional polariser 318 transmits light ray 410 normal to the display device 100 with a first polarisation component 372 that is a linear polarisation component parallel to the electric vector transmission direction 319 of the additional polariser 318.

In both states of operation, the polarisation component 372 remains unmodified by the retarders 300 and so transmitted polarisation component 382 is parallel to the transmission axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 10D thus illustrates that high reflectivity can be provided at typical snooper locations by means of the privacy state of the retarders 300. Thus, in the privacy mode of operation, the reflectivity for off-axis viewing positions is increased as illustrated in FIG. 10D, and the luminance for off-axis light from the spatial light modulator is reduced as illustrated in FIG. 10A.

In the public mode of operation, the control system 710, 752, 350 is arranged to switch the switchable liquid crystal retarder 301 into a second retarder state in which a phase shift is introduced to polarisation components of light passing therethrough along an axis inclined to a normal to the plane of the switchable liquid crystal retarder 301.

By way of comparison, solid angular extent 402D may be substantially the same as solid angular extent 402B in a public mode of operation. Such control of output solid angular extents 402C, 402D may be achieved by synchronous control of the sets 15, 17 of light sources and the at least one switchable liquid crystal retarder 300.

Advantageously a privacy mode may be achieved with low image visibility for off-axis viewing and a large solid angular extent may be provided with high efficiency for a public mode of operation, for sharing display imagery between multiple users and increasing image spatial uniformity.

Additional polariser 318 is arranged on the same output side of the spatial light modulator 48 as the display output polariser 218 which may be an absorbing dichroic polariser. The display polariser 218 and the additional polariser 318 have electric vector transmission directions 219, 319 that are parallel. As will be described below, such parallel alignment provides high transmission for central viewing locations.

A transmissive spatial light modulator 48 arranged to receive the output light from the backlight; an input polariser 210 arranged on the input side of the spatial light modulator between the backlight 20 and the spatial light modulator 48; an output polariser 218 arranged on the output side of the spatial light modulator 48; an additional polariser 318 arranged on the output side of the output polariser 218; and a switchable liquid crystal retarder 300 comprising a layer 314 of liquid crystal material arranged between the at least one additional polariser 318 and the output polariser 318 in this case in which the additional polariser 318 is arranged on the output side of the output polariser 218; and a control system 710 arranged to synchronously control the light sources 15, 17 and the at least one switchable liquid crystal retarder 300.

Control system 710 further comprises control of voltage controller 752 that is arranged to provide control of voltage driver 350, in order to achieve control of switchable liquid crystal retarder 301.

Features of the embodiment of FIG. 22B not discussed in further detail may be assumed to correspond to the features with equivalent reference numerals as discussed above, including any potential variations in the features.

Advantageously, a privacy display is provided that has high reflectivity to an off-axis snooper while maintaining low reflectivity for an on-axis observer. As described above, such increased reflectivity provides enhanced privacy performance for the display in an ambiently illuminated environment.

Operation in the public mode will now be described.

Figure 23A:
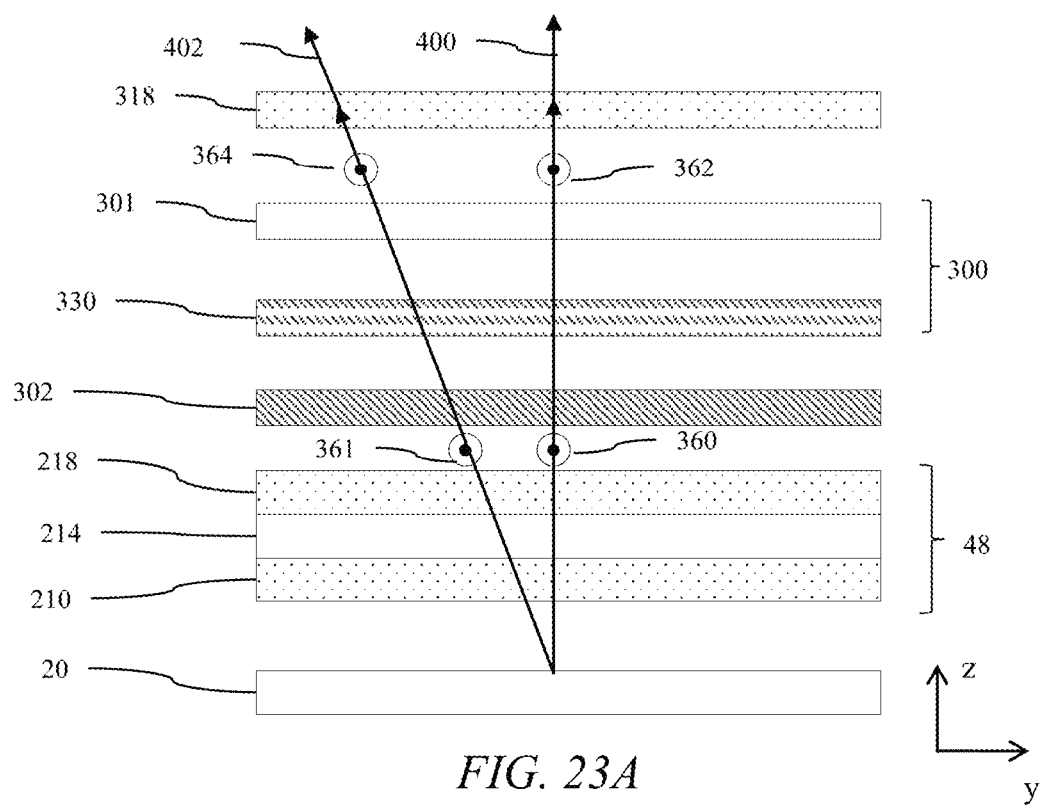
FIG. 23A is a schematic diagram illustrating in side view propagation of output light from a spatial light modulator through the optical stack of FIG. 1 in a public mode of operation.
Figure 23B:
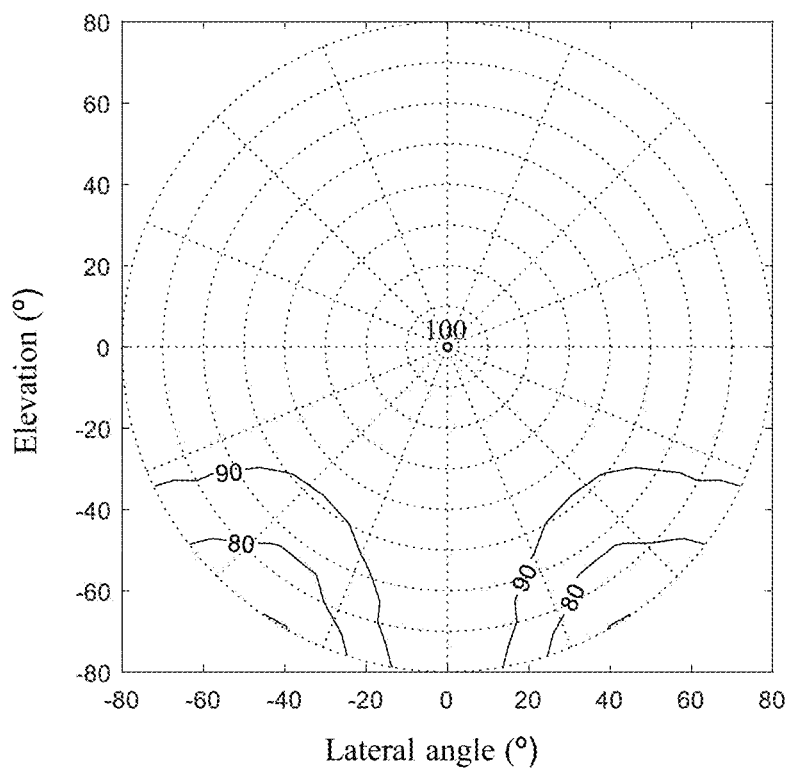
FIG. 23B is a schematic graph illustrating the variation of output luminance with polar direction for the transmitted light rays in FIG. 23A.

FIG. 23A is a schematic diagram illustrating in side view propagation of output light from a spatial light modulator through the optical stack of FIG. 1 in a public mode of operation; and FIG. 23B is a schematic graph illustrating the variation of output luminance with polar direction for the transmitted light rays in FIG. 23A.

Features of the embodiment of FIG. 23A and FIG. 23B not discussed in further detail may be assumed to correspond to the features with equivalent reference numerals as discussed above, including any potential variations in the features.

When the liquid crystal retarder 301 is in a first state of said two states, the retarders 300 provide no overall transformation of polarisation component 360, 361 to output light passing therethrough perpendicular to the plane of the switchable retarder 301 or at an acute angle to the perpendicular to the plane of the switchable retarder 301. That is polarisation component 362 is substantially the same as polarisation component 360 and polarisation component 364 is substantially the same as polarisation component 361. Thus the angular transmission profile of FIG. 23B is substantially uniformly transmitting across a wide polar region. Advantageously a display may be switched to a wide field of view.

Figure 23C:
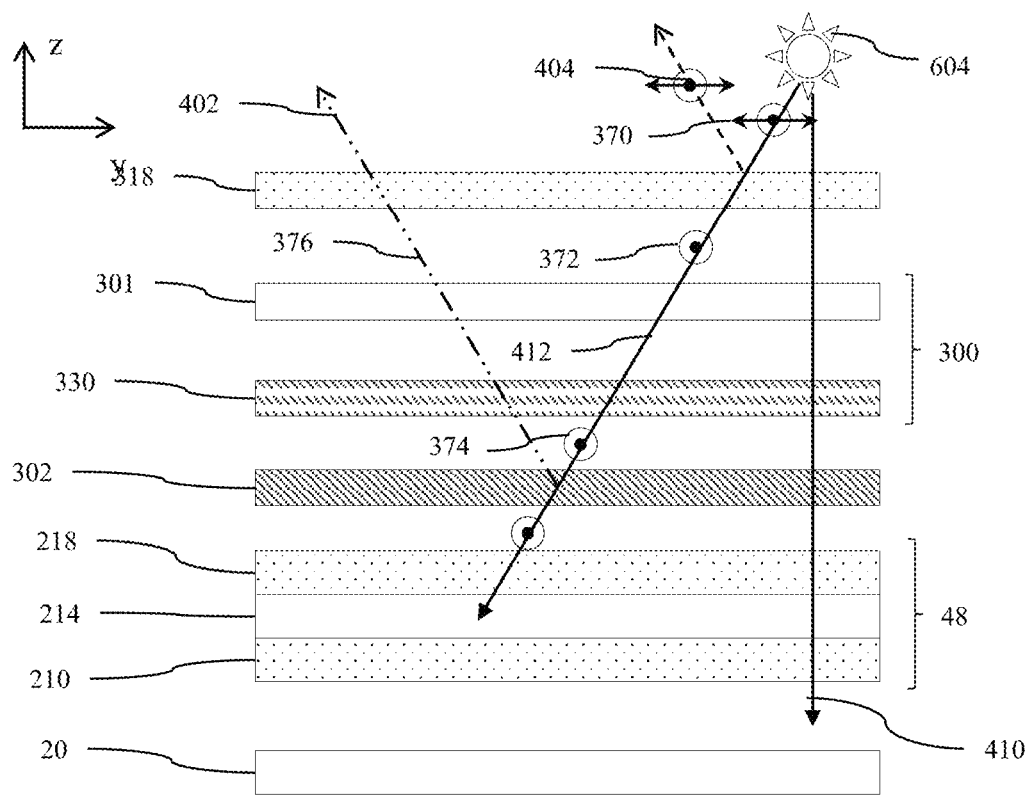
FIG. 23C is a schematic diagram illustrating in top view propagation of ambient illumination light through the optical stack of FIG. 1 in a public mode of operation.
Figure 23D:
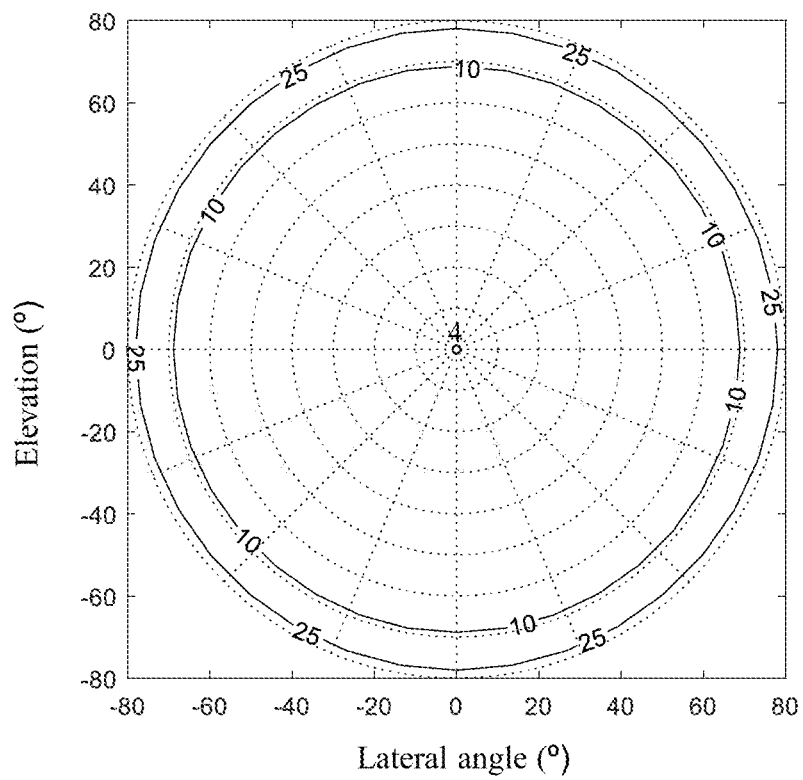
FIG. 23D is a schematic graph illustrating the variation of reflectivity with polar direction for the reflected light rays in FIG. 23C.

FIG. 23C is a schematic diagram illustrating in top view propagation of ambient illumination light through the optical stack of FIG. 1 in a public mode of operation; and FIG. 23D is a schematic graph illustrating the variation of reflectivity with polar direction for the reflected light rays in FIG. 23C.

Thus when the liquid crystal retarder 301 is in the first state of said two states, the retarders 300 provide no overall transformation of polarisation component 372 to ambient light rays 412 passing through the additional polariser 318 and then the retarders 300, that is perpendicular to the plane of the retarders 300 or at an acute angle to the perpendicular to the plane of the retarders 300.

In operation in the public mode, input light ray 412 has polarisation state 372 after transmission through the additional polariser 318. For both head-on and off-axis directions no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1.

Features of the embodiment of FIG. 23C and FIG. 23D not discussed in further detail may be assumed to correspond to the features with equivalent reference numerals as discussed above, including any potential variations in the features.

Advantageously in a public mode of operation, high luminance and low reflectivity is provided across a wide field of view. Such a display can be conveniently viewed with high contrast by multiple observers.

Other types of switchable privacy display will now be described.

A display device 100 that may be switched between privacy and public modes of operation comprises an imaging waveguide and an array of light sources as described in U.S. Pat. No. 9,519,153, which is incorporated by reference herein in its entirety. The imaging waveguide images an array of light sources to optical windows that may be controlled to provide high luminance on-axis and low luminance off-axis in a privacy mode, and high luminance with a large solid angle cone for public operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
    a spatial light modulator arranged to output spatially modulated light, the spatial light modulator including a display polariser arranged on a side of the spatial light modulator, the display polariser being a linear polariser;
    an additional polariser arranged on the same side of the spatial light modulator as the display polariser, the additional polariser being a linear polariser;
    at least one polar control retarder arranged between the additional polariser and the display polariser, and
    a light control film arranged in series with the spatial light modulator, the additional polariser and the at least one polar control retarder,
    wherein the light control film comprises an input surface, an output surface facing the input surface, an array of transmissive regions extending between the input surface and the output surface, and absorptive regions between the transmissive regions and extending at least partway between the input surface and the output surface.

2. A display device according to claim 1, wherein the light control film has a transmittance that is 5% or more in a range of polar angles in a direction in which the array of transmissive regions repeats that is at least 80° wide.

3. A display device according to claim 2, wherein the light control film has a transmittance that is 5% or more in a range of polar angles in a direction in which the array of transmissive regions repeats that is at least 90° wide.

4. A display device according to claim 2, wherein the light control film has a transmittance that is 5% or more in a range of polar angles in a direction in which the array of transmissive regions repeats that is at most 130° wide.

5. A display device according to claim 1, wherein the absorptive regions of the light control film have a thickness, t, wherein t is given by the expression $$t=(S_{IN}-S_{IN}^2/10p+S_{OUT})/(2*\tan(a \sin(\xi/n)))$$

where $S_{IN}$ is a width of an aperture of the input end of the absorptive regions, $S_{OUT}$ is a width of an aperture of the output end of the absorptive regions, p is a pitch of the transmissive regions in the direction in which the array of transmissive regions repeats, and n is the refractive index of the transmissive regions; wherein $\xi$ is 0.643 or more.

6. A display device according to claim 5, wherein $\xi$ is 0.707 or more.

7. A display device according to claim 5, wherein $\xi$ is 0.906 or less.

8. A display device according to claim 1, wherein the light control film has a transmittance that has profiles with polar angle in a direction in which the array of transmissive regions repeats that have centre lines directed inwardly towards an optical axis extending forwardly from the centre of the spatial light modulator.

9. A display device according to claim 8, wherein said centre lines of said profiles are directed towards a common point.

10. A display device according to claim 1, wherein the light control film has a transmittance that has a profile with polar angle in a direction in which the array of transmissive regions repeats that is centred on the normal to the plane of the spatial light modulator at all positions across the light control film.

11. A display device according to claim 1, wherein the transmissive regions are tilted so that axes defined in respect of each transmissive region between centres of apertures of input and output ends of the transmissive regions are directed inwardly towards an optical axis extending forwardly from the centre of the spatial light modulator.

12. A display device according to claim 11, wherein said axes are directed towards a common point.

13. A display device according to claim 1, wherein the transmissive regions have axes defined in respect of each transmissive region between centres of apertures of input and output ends of the transmissive regions are normal to the plane of the spatial light modulator at all positions across the light control film.

14. A display device according to claim 1, wherein the array of transmissive regions is a one-dimensional array of elongate transmissive regions.

15. A display device according to claim 1, wherein absorptive regions between the transmissive regions extend between the input surface and the output surface.

16. A display device according to claim 1, wherein the light control film is provided on a support substrate.

17. A display device according to claim 1, wherein said display polariser is an output display polariser arranged on the output side of the spatial light modulator.

18. A display device according to claim 17, wherein the display device further comprises a reflective polariser arranged between the output display polariser and at least one first polar control retarder, the reflective polariser being a linear polariser.

19. A display device according to claim 18, wherein the light control film is arranged between the reflective polariser and the spatial light modulator.

20. A display device according to claim 17, wherein the spatial light modulator comprises an emissive spatial light modulator arranged to emit the spatially modulated light.

21. A display device according to claim 17, wherein the display device further comprises a backlight arranged to output light, the spatial light modulator comprises a transmissive spatial light modulator arranged to receive and spatially modulate the output light from the backlight, and the light control film is arranged between the backlight and the spatial light modulator.

22. A display device according to claim 17, wherein the display device further comprises a backlight arranged to output light, the spatial light modulator comprises a transmissive spatial light modulator arranged to receive and spatially modulate the output light from the backlight, and the light control film is arranged in front of the spatial light modulator.

23. A display device according to claim 1, wherein the display device further comprises a backlight arranged to output light, the spatial light modulator comprises a transmissive spatial light modulator arranged to receive and spatially modulate the output light from the backlight, and said display polariser is an input display polariser arranged on the input side of the spatial light modulator.

24. A display device according to claim 23, wherein the light control film is arranged between the backlight and the additional polariser.

25. A display device according to claim 1, wherein the at least one polar control retarder includes a switchable liquid crystal retarder.

26. A display device according to claim 25, wherein the switchable liquid crystal retarder comprises a layer of liquid crystal material and at least one surface alignment layer disposed adjacent to the layer of liquid crystal material.

27. A display device according to claim 26, wherein the switchable liquid crystal retarder comprises two surface alignment layers disposed adjacent to the layer of liquid crystal material and on opposite sides thereof and arranged on respective liquid crystal encapsulation substrates.

28. A display device according to claim 27, wherein the light control film is provided on one of the liquid crystal encapsulation substrates.

29. A display device according to claim 25, wherein the at least one polar control retarder further includes at least one passive compensation retarder.

30. A display device according to claim 29, wherein the support substrate comprises at least one passive compensation retarder of the at least one passive compensation retarders.

* * * * *